United States Patent
Imanishi et al.

(10) Patent No.: US 7,004,882 B2
(45) Date of Patent: Feb. 28, 2006

(54) TOROIDAL-TYPE CONTINUOUSLY VARIABLE TRANSMISSION

(75) Inventors: Takashi Imanishi, Kanagawa (JP);
Masami Tanaka, Kanagawa (JP);
Tomofumi Yamashita, Kanagawa (JP);
Kouji Ishikawa, Kanagawa (JP);
Nobuo Goto, Kanagawa (JP)

(73) Assignee: NSK. Ltd., Tokyo (JP)

( * ) Notice: Subject to any disclaimer, the term of this patent is extended or adjusted under 35 U.S.C. 154(b) by 300 days.

(21) Appl. No.: 10/058,032

(22) Filed: Jan. 29, 2002

(65) Prior Publication Data

US 2002/0115525 A1 Aug. 22, 2002

(30) Foreign Application Priority Data

| Jan. 30, 2001 | (JP) | ............................ P. 2001-021916 |
| Jun. 28, 2001 | (JP) | ............................ P. 2001-195929 |
| Oct. 22, 2001 | (JP) | ............................ P. 2001-324163 |

(51) Int. Cl.
*F16H 15/38* (2006.01)

(52) U.S. Cl. .......................................... 476/40; 476/46
(58) Field of Classification Search ................. 476/40, 476/42, 46
See application file for complete search history.

(56) References Cited

U.S. PATENT DOCUMENTS

| 609,778 A | * | 8/1898 | Capewell | .................... 384/558 |
| 2,345,564 A | * | 4/1944 | Allen | .......................... 384/208 |
| 5,033,322 A | | 7/1991 | Nakano | |
| 6,464,615 B1 | * | 10/2002 | Kumura et al. | ................ 476/40 |
| 6,592,491 B1 | * | 7/2003 | Machida et al. | ............... 476/40 |

FOREIGN PATENT DOCUMENTS

| JP | 6-185590 | * | 7/1994 |
| JP | 2568684 | | 10/1996 |
| JP | 9-42401 | * | 2/1997 |
| JP | 9-291998 | | 11/1997 |
| JP | 10-274300 | | 10/1998 |
| JP | 2000-9200 | | 1/2000 |
| JP | 2001-9199 | | 1/2000 |
| JP | 2000-291756 | | 10/2000 |
| JP | 2000-320634 | | 11/2000 |

* cited by examiner

*Primary Examiner*—William C. Joyce
(74) *Attorney, Agent, or Firm*—Sughrue Mion, PLLC

(57) ABSTRACT

A toroidal-type continuously variable transmission which includes: a casing; input and output disks respectively including inner surfaces, disposed concentrically with each other inside the casing, and supported so as to rotate independently of each other; a plurality of trunnions each including even-numbered pivot shafts existing at right angles to a central-axis direction of the disks and disposed concentrically with to in parallel to each other, and being swingable about the pivot shafts; a plurality of shift shafts respectively projected out from the trunnions; a plurality of power rollers held by and between respective inner surfaces of the disks so as to be rotatably supported on the shift shafts; and a support member fixed directly to the casing and supporting the pivot shafts so as to be shifted in an axial and an inclined rotation direction thereof.

1 Claim, 15 Drawing Sheets

TOROIDAL-TYPE CONTINUOUSLY VARIABLE TRANSMISSION

BACKGROUND OF THE INVENTION

The present invention relates to a toroidal-type continuously variable transmission which can be used as a transmission for vehicles and various industrial machines.

A toroidal-type continuously variable transmission of a double cavity system, which is used, for example, as a transmission for a car, is structured as shown in FIGS. 15 and 16. That is, as shown in FIG. 15, inside a casing 1, an input shaft 2 is rotatably supported. On the outer periphery of the input shaft 2, a circular-pipe-shaped transmission shaft 3 is supported. In this case, the transmission shaft 3 is arranged concentrically with the input shaft 2 and can be rotated with respect to the input shaft 2.

On the near-to-two-end-portions of the transmission shaft 3, first and second input disks 4 and 5 are supported respectively through their associated ball splines 6. In this case, the first and second input disks 4 and 5 are disposed concentrically with each other, and their respective inner surfaces 4a and 5a mutually opposed to each other. In addition the first and second input disks 4 and 5 can be rotated in synchronization with each other inside the casing 1.

On the periphery of the middle portion of the transmission shaft 3, first and second output disks 7 and 8 are supported through a sleeve 9. On the outer peripheral surface of the middle portion of the sleeve 9, an output gear 10 is disposed in such a manner that they are united together as an integral body. This output gear 10 is arranged concentrically with the transmission shaft 3 and has an inside diameter larger than the outside diameter of the transmission shaft 3. Also, the output gear 10 is rotatably supported through a pair of rolling bearings 12 on a support wall 11 disposed within the casing 1.

The first and second output disks 7 and 8 are spline engaged with the two end portions of the sleeve 9. In this case, the first and second output disks 7 and 8 are disposed such that their respective inner surfaces 7a and 8a are directed in the mutually opposite directions. Therefore, the inner surfaces 4a and 7a of the first input and output disks 4 and 7 are opposed to each other, while the outer surfaces 5a and 8a of the second input and output disks 5 and 8 are opposed to each other.

As shown in FIG. 16, laterally of the first and second output disks 7 and 8 inside the casing 1, a pair of yokes 13a and 13b are supported in such a manner that they sandwich the two disks 7 and 8 from both sides thereof. The pair of yokes 13a and 13b are formed of metal such as steel by press working or by forging in a rectangular shape. In addition, in order to support pivot shafts 16 respectively disposed on the respective two end portions of two trunnions 14 (which will be discussed later) in such a manner that they can be swung, there are formed circular-shaped support holes 18 in the four corners of the yokes 13a and 13b. In the width-direction central portions of the yokes 13a and 13b, there are formed circular-shaped securing holes 19.

The pair of yokes 13a and 13b are supported on a pair of spherical-surface-shaped support posts 20a and 20b respectively formed in the mutually opposed portions of the inner surface of the casing 1 in such a manner that they can be shifted slightly. The two support posts 20a and 20b are respectively disposed in a first cavity 21 and a second cavity 22 in such a manner that they are opposed to each other. The first cavity 21 is an intermediate portion between the inner surface 4a of the first input disk 4 and the inner surface 7a of the first output disk 7. The second cavity 22 is an intermediate portion between the inner surface 5a of the second input disk 5 and the inner surface 8a of the second output disk 8. Therefore, in the state of that the pair of yokes 13a and 13b are supported on their associated support posts 20a and 20b, they are disposed in such a manner that the one-end portions of the pair of yokes 13a and 13b are opposed to the outer peripheral portion of the first cavity 21, and the other-end portions thereof are opposed to the outer peripheral portion of the second cavity 22 in an axial direction of the transmission shaft 3.

The first and second cavities 21 and 22 are the same in structure. Therefore, the description thereof will be given below only of the first cavity 21.

In the first cavity 21, there are disposed a pair of trunnions 14. On the two end portions of each of the trunnions 14, pivot shafts 16 are disposed so as to be concentric with each other. These pivot shafts 16 are supported on the one-end portions of the pair of yokes 13a and 13b in such a manner that they can be swung and can be shifted in the axial direction thereof. That is, the pivot shafts 16 are supported inside support holes 18 formed in the one-end portions of the pair of yokes 13a and 13b by radial needle roller bearings 26 respectively. Each of the radial needle roller bearings 26 is composed of an outer race 27, the outer peripheral surface thereof has a spherical-shaped convex surface and the inner peripheral surface thereof has a cylindrical-shaped surface, and a plurality of needle rollers 28.

There is circular hole 30 on an intermediate of the respective trunnions 14. In the respective circular holes 30, shift shafts 31 are supported. Each of the shift shafts 31 includes a support shaft portion 33 and a pivot support shaft portion 34 which are parallel to each other but are eccentric with respect to each other. The support shaft portion 33 is supported inside the circular hole 30 through a radial needle roller bearing 35. On the periphery of the pivot support shaft portion 34, there is supported a power roller 36 through another radial needle roller bearing 38.

By the way, a pair of the shift shafts 31 are provided in every set of first and second cavities 21, 22. The pair of the shift shafts 31 are disposed in such a manner that they are situated on the 180° opposite side to the input shaft 2 and transmission shaft 3 respectively in every set of first and second cavities 21, 22. Also, the directions of the pivot support shaft portions 34 of the shift shafts 31 are eccentric with respect to the support shaft portions 33 of the shift shafts 31. The direction of the pivot support portion 34 is the same direction as the rotation direction of the first and second input disks 4, 5 as well as first and second output disks 7, 8. Further, the eccentric direction is also substantially perpendicular to the mounting direction of the input shaft 2. Therefore, each power roller 36 is supported in such a manner that it can be slightly shifted along the longitudinal direction of the input shaft 2 and transmission shaft 3. As a result of this, there is a case where the power roller 36 tends to shift in the axial direction of the input shaft 2 and transmission shaft 3 due to variations in the elastic deformation amount of component members caused by variations in the torque that is transmitted from the toroidal-type continuously variable transmission. In this case, there can be avoided the possibility that an unreasonable force can be applied to the component members, and thus the shifting movement of the power roller 36 can be absorbed.

Also, between the outer peripheral surface of the power roller 36 and the inner peripheral surface of the middle portion of the trunnion 14, there are interposed a thrust ball bearing 39 and a thrust bearing 40 such as a sliding bearing or a needle roller bearing by turns from the outer surface of the power roller 36. The thrust ball bearing 39, while supporting a thrust-direction load to be applied to the power roller 36, allows the power roller 36 to rotate. Also, the thrust bearing 40, while supporting a thrust load to be applied to the outer race 41 of the thrust ball bearing 39 from the power roller 36, allows the pivot support shaft portion 34 and outer race 41 to be swung about the support shaft portion 33.

To one end portion of each of the trunnions 14, there is connected a drive rod 42. To the outer peripheral surface of the middle portion of the drive rod 42, there is fixed a drive piston 43. This drive piston 43 is fitted oil-tight into a drive cylinder 44. And, the drive piston 43 forms an actuator, which is used to shift the trunnion 14 in the axial direction thereof.

As shown in FIG. 15, between the input shaft 2 and first input disk 4, there is interposed a pressure device 45 of a loading cam type. This pressure device 45 includes a cam plate 46 and a plurality of rollers 48 and is arranged such that, due to the rotation of the input shaft 2, it can press the first input disk 4 toward the second input disk 5 and rotate the first input disk 4. In this case, the cam plate 46 is spline engaged with the middle portion of the input shaft 2. The cam plate 46 is also supported in such a manner that it is prevented from shifting in the axial direction of the input shaft 2. The cam plate 46 can be rotated together with the input shaft 2. Also, the plurality of rollers 48 are rollably held on a retainer 47.

When the above toroidal-type continuously variable transmission is in operation, the rotation of the input shaft 2 is transmitted through the pressure device 45 to the first input disk 4, so that the first and second input disks 4 and 5 are rotated in synchronization with each other. The rotational movements of the first and second input disks 4 and 5 are transmitted through the power rollers 36 to the first and second output disks 7 and 8. The rotational movements of the first and second output disks 7 and 8 are taken out by the output gear 10.

To change a rotation speed ratio between the input shaft 2 and output gear 10, in accordance with the switching operation of a control valve (not shown), the drive pistons 43, a pair of which are disposed in each of the first and second cavities 21 and 22, may be shifted by the same distance in the mutually opposite directions in every cavities 21 and 22. With the shifting movements of the drive pistons 43, two pairs of trunnions 14, that is, a total of four trunnions 14 are respectively shifted in the opposite directions, so that one power roller 36 is shifted downward and the other power roller 36 is shifted upward. This changes the direction of a tangential-direction force which acts on the contact portion between the peripheral surfaces of the respective power rollers 36 and the inner surfaces 4a, 5a of the first and second input disks 4, 5 and the inner surfaces 7a, 8a of the first and second output disks 7, 8. In addition, with such change in the direction of the tangential-direction force, the trunnions 14 are swung in the opposite directions about the pivot shafts 16 pivotally supported on the yokes 13a and 13b. This changes the contact positions between the peripheral surfaces of the power rollers 36 and the first and second input disks 4, 5 as well as first and second output disks 7, 8, thereby changing the rotation speed ratio between the input shaft 2 and output gear 10.

However, in the above-structured conventional toroidal-type continuously variable transmission, since the trunnions 14 are supported inside the casing 1 through the support posts 20a, 20b and yokes 13a, 13b, the number of parts is increased. This complicates the manufacturing operation of the parts, the managing operation of the parts and the assembling operation of the parts. This also increases the height dimension of the toroidal-type continuously variable transmission to thereby be unable to reduce the size and weight of the toroidal-type continuously variable transmission.

Also, generally, in the case of a vehicle of an FR system, in order to be able to secure living space within the vehicle, the upper portion of the casing 1 must be formed compact. That is, as shown in FIG. 17, when the casing 1 is viewed from the axial direction thereof, it provides a projecting shape; and, the inside space of the casing upper portion 1a is formed narrower than the inside space of the casing lower portion 1b.

In the above-mentioned conventional toroidal-type continuously variable transmission, the upper and lower portions of the trunnions 14 are swingably supported inside the casing 1 through the support posts 20a, 20b and yokes 13a, 13b. Then, in order to the upper yoke 13a can be swung about the support post 20a in the gear change operation, a sufficient inside space must be secured in the casing upper portion 1a. However, as described above, in case where the upper portion of the casing 1 must be formed compact, a sufficient inside space cannot be secured in the casing upper portion 1a.

Also, there is a case where the upper and lower pivot shafts 16 of the trunnions 14 are swingably supported inside the casing 1 through the support posts 20a, 20b and yokes 13a, 13b. In this case, the number of parts increases, and it complicates that the operation to manufacture the parts, the operation to manage the parts and the operation to assemble the parts.

Further, the upper yoke 13a is connected to the upper pivot shaft 16 of the trunnion 14 through the radial needle roller bearing 26 restricted by an axial-direction restrict member which is designated by a numeral 49 in FIG. 17. However, in this structure, when the upper pivot shaft 16 of the trunnion 14 is swung, stresses are concentrated on the portions thereof which are contacted with the axial-direction restrict member 49 and radial needle roller bearing 26, which degrades the durability of the pivot shaft 16.

In view of the above, for example, as shown in FIG. 4 of Japanese Patent Unexamined Publication No. 2000-9200, there has been developed a structure in which a yoke is fixed directly to the inside of a casing. In addition there has been also developed two pivot shafts disposed on the two end portions of each trunnion are supported on the yoke through ball splines in such a manner that they can be moved in the vertical direction.

According to the above structure, since the yoke is fixed directly to the casing, the number of parts can be reduced. This can simplify the parts manufacturing operation, the parts managing operation and the parts assembling operation. In addition, this can also decrease the height dimension of the toroidal-type continuously variable transmission to thereby able to reduce the size and weight of the toroidal-type continuously variable transmission.

However, in the above-mentioned toroidal-type continuously variable transmission disclosed in Japanese Patent Unexamined Publication 2000-9200, the ball spline is formed in the pivot shaft of the trunnion and thus the pivot shaft is able to move in the vertical direction. Also, the outer race of the ball spline provides a spherical surface, whereby, when the trunnion is elastically deformed, the trunnion can be prevented from application of the edge loads. Further, due to the needle roller bearing of the inner race of the ball spline, the trunnion is able to rotate inclinedly about the pivot shaft.

Therefore, the trunnion support structure is complicated and thus the number of parts is also large. Also, when a ball is assembled into the upper ball spline, a hole must be made in the casing, which lowers the rigidity of the casing. Further, in the case of the ball spline which allows the trunnion to move in the vertical direction, as the ball movements, there coexist a sliding movement and a rolling movement according to the positions of the ball when assembling the ball into the upper ball spline. Generally, the friction coefficient of the rolling movement is at least one digit smaller than that of the sliding movement; and, for this reason, in case where a sliding movement exists together with the vertical-direction movements of the trunnions, the vertical-direction forces in the respective trunnions are uneven.

Also, according to the above-mentioned toroidal-type continuously variable transmission disclosed in Japanese Patent unexamined Publication 2000-9200, by fixing all yokes directly to the inside of the casing, the number of parts is reduced, which makes it unnecessary to secure the inner space of the casing. However, there is no system which, in the gear change operation, can mechanically guarantee the synchronization of the vertical-direction movements of all trunnions, so that the vertical-direction movements of the trunnions are unstable.

SUMMARY OF THE INVENTION

The present invention aims at eliminating the drawbacks found in the above-mentioned toroidal-type continuously variable transmissions. Accordingly, it is an object of the invention to provide a toroidal-type continuously variable transmission which omits the ball spline from the trunnions to thereby be able to reduce the number of parts and facilitate the assembling of the parts. It is also an object of the invention to provide a toroidal-type continuously variable transmission which is also able to equalize or standardize the vertical-direction movements of the respective trunnions.

Also, it is another object of the invention to provide a toroidal-type continuously variable transmission which can make the casing compact in order to enhance the mountability of the present transmission into a vehicle. In addition, it is another object of the invention to provide a toroidal-type continuously variable transmission which can enhance the guarantee of the synchronization of the vertical-direction movements of all trunnions in the gear change operation.

In attaining the above objects, according to a first aspect of the invention, there is provided a toroidal-type continuously variable transmission, comprising: a casing; input and output disks respectively including inner surfaces, disposed concentrically with each other inside the casing, and supported in such a manner that they are rotated independently of each other; a plurality of trunnions each including even-numbered pivot shafts existing at twisted positions which are at right angles to a central-axis direction of the input and output disks and disposed concentrically with to in parallel to each other, and being swingable about the pivot shafts; a plurality of shift shafts respectively projected out from an inner surfaces of the trunnions; a plurality of power rollers held by and between respective facing inner surfaces of the input and output disks in such a manner that they are rotatably supported on the shift shafts; and a support member fixed directly to the casing and supporting the pivot shafts of the trunnions in such a manner that they are shifted in an axial direction thereof and in an inclined rotation direction thereof.

It is preferable that the above toroidal-type continuously variable transmission further includes: a plurality of needle roller bearings for supporting the pivot shafts of the trunnions on the support member; and a plurality of spherical-surface bearings for supporting the needle roller bearings; wherein the spherical-surface bearings each includes spherical-surface-shaped inner and outer races.

It is preferable that, in the above toroidal-type continuously variable transmission, wherein the outer race of the spherical-surface bearing include one cut-out portion in an inner peripheral surface of spherical surface thereof, and the inner race is press-fitted the outer race from the cut-out portion to thereby unite the inner and outer races as an integral body.

It is preferable that, in the above toroidal-type continuously variable transmission, wherein the support member and the outer race of the spherical-surface bearing are formed as an integral body.

It is preferable that, in the above toroidal-type continuously variable transmission, wherein the axial-direction shifting movement of the trunnion is carried out between the pivot shaft and the needle roller bearing by a sliding movement of the trunnion.

It is preferable that, in the above toroidal-type continuously variable transmission, wherein the axial-direction shifting movement of the trunnion is carried out between the needle roller bearing and the spherical-surface bearing by a sliding movement of the trunnion.

It is preferable that the above toroidal-type continuously variable transmission comprises: a casing; input and output disks respectively including inner surfaces, disposed concentrically with each other inside the casing, and supported in such a manner that they are rotated independently of each other; a plurality of trunnions each including an even-numbered pivot shafts of upper and lower portions thereof existing at twisted positions which are at right angles to a central-axis direction of the input and output disks and disposed concentrically with or in parallel to each other, the trunnions respectively being swingable about the pivot shafts; a plurality of shift shafts respectively projected out from the inner surfaces of the trunnions; a plurality of power rollers held by and between respective facing inner surfaces of the input and output disks in such a manner that they are rotatably supported on the shift shafts; and upper and lower support members respectively supporting the pivot shafts of upper and lower portions of the trunnions, wherein one of the upper and lower support members is fixed directly to the casing and the other of the upper and lower support members is swingably supported on the casing.

It is preferable that, in the above toroidal-type continuously variable transmission, wherein the toroidal-type continuously variable transmission is installed into a vehicle of an FR type, the upper support member is fixed directly to the casing, and the lower support member is swingably supported on the casing.

It is preferable that, in the above toroidal-type continuously variable transmission, wherein the pivot shafts of the trunnions are respectively supported by their associated radial needle roller bearings and ball splines in such a manner that they are swingingly shifted and are shifted in an axial direction thereof.

It is preferable that, in the above toroidal-type continuously variable transmission, wherein each of the ball splines is disposed on an outer periphery of the radial needle roller bearing.

According to the above structure, the vertical-direction movements of the respective trunnions are smooth and the forces can be equalized in the respective trunnions. Also, when the pivot shafts of the trunnions are shifted in the vertical direction thereof, the trunnions are rotated about the pivot shafts of the trunnions simultaneously with the vertical-direction shifting movements of the pivot shafts. Therefore, the movements of the trunnions provide rolling movements although they include slight degrees of sliding movements. This can reduce the frictional forces much more than a simple sliding movement, thereby being able to enhance the synchronization and stability of the vertical-direction movements of the trunnions in the gear change operation. Also, the position, which is at right angle to a central-axis, is herein after referred to as "twisted position".

Also, according to a second aspect of the invention, there is provided a toroidal-type continuously variable transmission, comprising: a casing; input and output disks respectively including inner surfaces, and supported concentrically with each other in such a manner that their respective inner surfaces opposed to each other and they are supported rotatably in an inside of the casing; a plurality of trunnions respectively including a plurality of pivot shafts disposed at twisted positions with respect to a central-axes of the input and output disks, wherein the trunnions being swingable about the pivot shafts; a plurality of shift shafts supported in such a manner that they are projected from an inner surfaces of the trunnions; a plurality of power rollers respectively held by and between the input and output disks in such a manner that they are rotatably supported on peripheries of the shift shafts; and a yoke fixed directly to the casing and including a bearing for supporting the pivot shafts of the trunnions.

It is preferable that, in the above toroidal-type continuously variable transmission, wherein the bearing disposed on the yoke, comprising: an outer race fixed to the yoke; an inner race formed by an outer peripheral surface of the pivot shaft of the trunnion; and a roller rollably interposed between the outer race and the inner race, wherein the bearing supports the pivot shafts of each of the trunnions in such a manner that the pivot shafts shift in an axial direction thereof and in an inclined rotation direction thereof, a raceway surface of the inner race is formed as a straight-shaped surface extending in the axial direction of the pivot shaft, a raceway surface of the outer race is formed as a curved surface having a given radius of curvature, and an outer peripheral surface of the roller to be contacted with the inner race and the outer race is formed as a curved surface having a given radius of curvature.

According to the second aspect of the invention, because the roller is embraced by the curved surface of the outer race, the axial-direction movement of the trunnion is made only on the inner race side. That is, the trunnion axial-direction movement is carried out not on the outer race side, where the contact area of the trunnion with the roller increases due to the spherical surface contact between them. However, the trunnion axial-direction movement is carried out on the inner race side, where the contact area of the trunnion with the roller decreases due to the point contact between the linear-shaped rolling surface and the curved surface. This can reduce the dynamic friction of the trunnion when the trunnion moves in the axial direction thereof, which leads to the stabilized gear change operation.

Further, according to a third aspect of the invention, in a toroidal-type continuously variable transmission as set forth in the second aspect of the invention, wherein the bearing disposed on the yoke, comprising: an outer race fixed to the yoke; an inner race formed by an outer peripheral surface of the pivot shaft of the trunnion; and a roller rollably interposed between the outer race and the inner race, wherein the bearing supports the pivot shafts of each of the trunnions in such a manner that the pivot shafts shift in an axial direction thereof and in an inclined rotation direction thereof, a raceway surface of the outer race is formed in a straight-shaped surface extending in the axial direction of the pivot shaft, a raceway surface of the inner race is formed as a curved surface having a given radius of curvature, and a outer peripheral surface of the roller to be contacted with the inner race and the outer race is formed as a curved surface having a given radius of curvature.

Therefore, according to the third aspect of the invention, the axial-direction movement of the trunnion is made only on the outer race side which has a small contact area. This can reduce the dynamic friction of the trunnion when the trunnion moves in the axial direction, which leads to the stabilized gear change operation. Also, generally, in the case of a bearing, the inner race side is severer in surface pressure than the outer race side. Therefore, under the using condition which requires a severe surface pressure, as in the third aspect of the invention, in case where the raceway surface of the inner race is formed as a curved surface and the raceway surface of the outer race is formed as a linear-shaped surface, the surface pressure can be reduced.

According to a fourth aspect of the invention, in a toroidal-type continuously variable transmission as set forth in the second aspect of the invention, wherein the bearing disposed on the yoke, comprising: a needle roller to be contacted with the pivot shaft of the trunnion; and a spherical-surface bearing, wherein the bearing supports the pivot shafts of the trunnion in such a manner that the pivot shafts can be shifted in an axial direction thereof and in an inclined rotation direction thereof, and the needle roller is divided in the axial direction of the pivot shaft into a plurality of parts.

Therefore, according to the fourth aspect of the invention, since the needle roller is divided into two sections, not only the edge load can be reduced but also the gear change operation of the trunnion can be executed smoothly.

According to a fifth aspect of the invention, a toroidal-type continuously variable transmission as set forth in the second aspect of the invention, wherein the bearing disposed on the yoke, comprising: a needle roller to be contacted with the pivot shaft of the trunnion; and a spherical-surface bearing, wherein the bearing supports the pivot shafts of the trunnion in such a manner that the pivot shafts shift in an axial direction thereof and in an inclined rotation direction thereof, and wherein the spherical-surface bearing includes an outer race fixed to the yoke and an inner race to be spherical-surface connected to the outer race and holding the needle roller, a center of curvature of connecting surface of the inner race to be spherical-surface connected to the outer race of the spherical-surface bearing lies on the inclined rotation axis of the trunnion, a center of curvature of connecting surface of the outer race to be spherical-surface connected to the inner race lies to keep away from the inclined rotation axis of the trunnion, and the radius of curvature of connecting surface of the inner race is set smaller than the radius of curvature of connecting surface of the outer race.

Therefore, according to the fifth aspect of the invention, the elastic deformation of the trunnion can be absorbed easily.

According to a sixth aspect of the invention, a toroidal-type continuously variable transmission as set forth in the second aspect of the invention, wherein the bearing disposed on the yoke, comprising: a needle roller to be contacted with the pivot shaft of the trunnion; and a spherical-surface bearing, wherein the bearing supports the pivot shafts of the trunnion in such a manner that the pivot shafts can be shifted in an axial direction thereof and in an inclined rotation direction thereof, the spherical-surface bearing includes an outer race fixed to the yoke, an inner race to be spherical-surface connected to the outer race and holding the needle roller, a clearance is formed between the inner race and the outer race, and the central-axis of the outer race of the spherical-surface bearing is offset with respect to the inclined rotation axis of the trunnion.

It is preferable that, in the above toroidal-type continuously variable transmission, wherein a center of curvature of connecting surface of the inner race to be spherical-surface connected to the outer race of the spherical-surface bearing lies on an inclined rotation axis of the trunnion, a center of curvature of connecting surface of the outer race to be spherical-surface connected to the inner race lies to keep away from the inclined rotation axis of the trunnion, and the radius of curvature of connecting surface of the inner race is set smaller than the radius of curvature of connecting surface of the outer race.

It is preferable that, in the above toroidal-type continuously variable transmission, wherein the radius of curvature of connecting surface of the inner race and the radius of curvature of connecting surface of the outer race are set equal to each other.

It is preferable that, in the above toroidal-type continuously variable transmission, wherein the connecting surface of the outer race is formed as a straight-shaped surface.

Therefore, according to the sixth aspect of the invention, when the trunnion is elastically deformed, the deformation of the trunnion can be absorbed by a clearance formed between the inner and outer races. Therefore, even in case where the trunnion is deformed, the deformation has no ill effects on the gear change operation.

BRIEF DESCRIPTION OF THE DRAWINGS

FIG. 2A is a plan view thereof, FIG. 2B is a section view thereof taken along the line B—B shown in FIG. 2A, and FIG. 2C is a section view taken along the line C—C shown in FIG. 2A;

DETAILED DESCRIPTION OF THE PREFERRED EMBODIMENTS

Now, description will be given below of the preferred embodiments of a toroidal-type continuously variable transmission according to the invention with reference to the accompanying drawings. However, in the following embodiments, parts, which are the same in structure as the previously described conventional transmissions, are given the same designations and thus the description thereof omitted.

Figure 1:
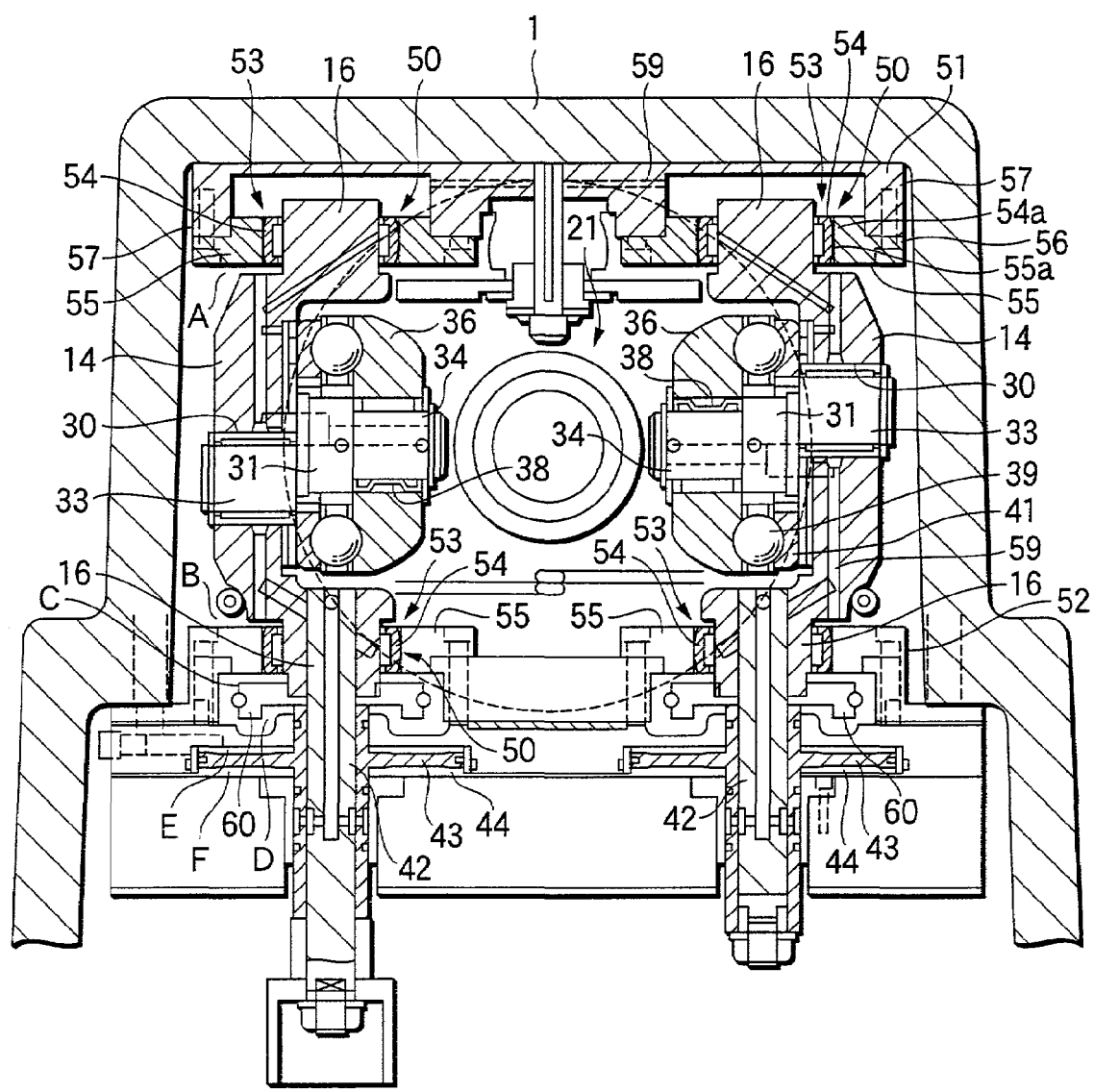
FIG. 1 shows a toroidal-type continuously variable transmission according to a first embodiment of the invention, specifically, a section view thereof corresponding to the section view taken along the line A—A shown in FIG. 15.
Figure 2B:
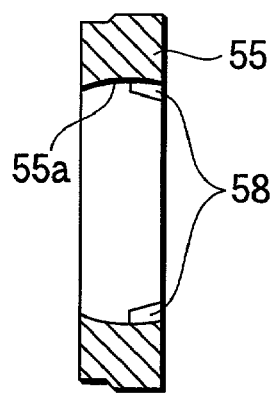
FIGS. 2A to 2C show an outer race of a spherical-surface bearing employed in the first embodiment, specifically.
Figure 2A:
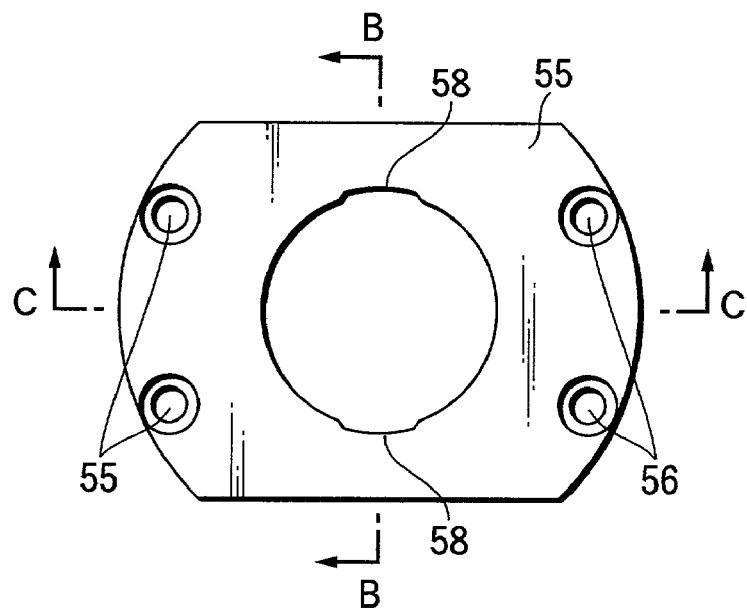
Figure 2C:
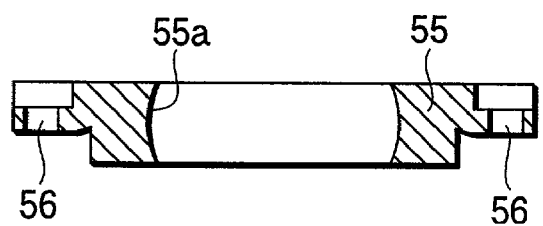
Figure 15:
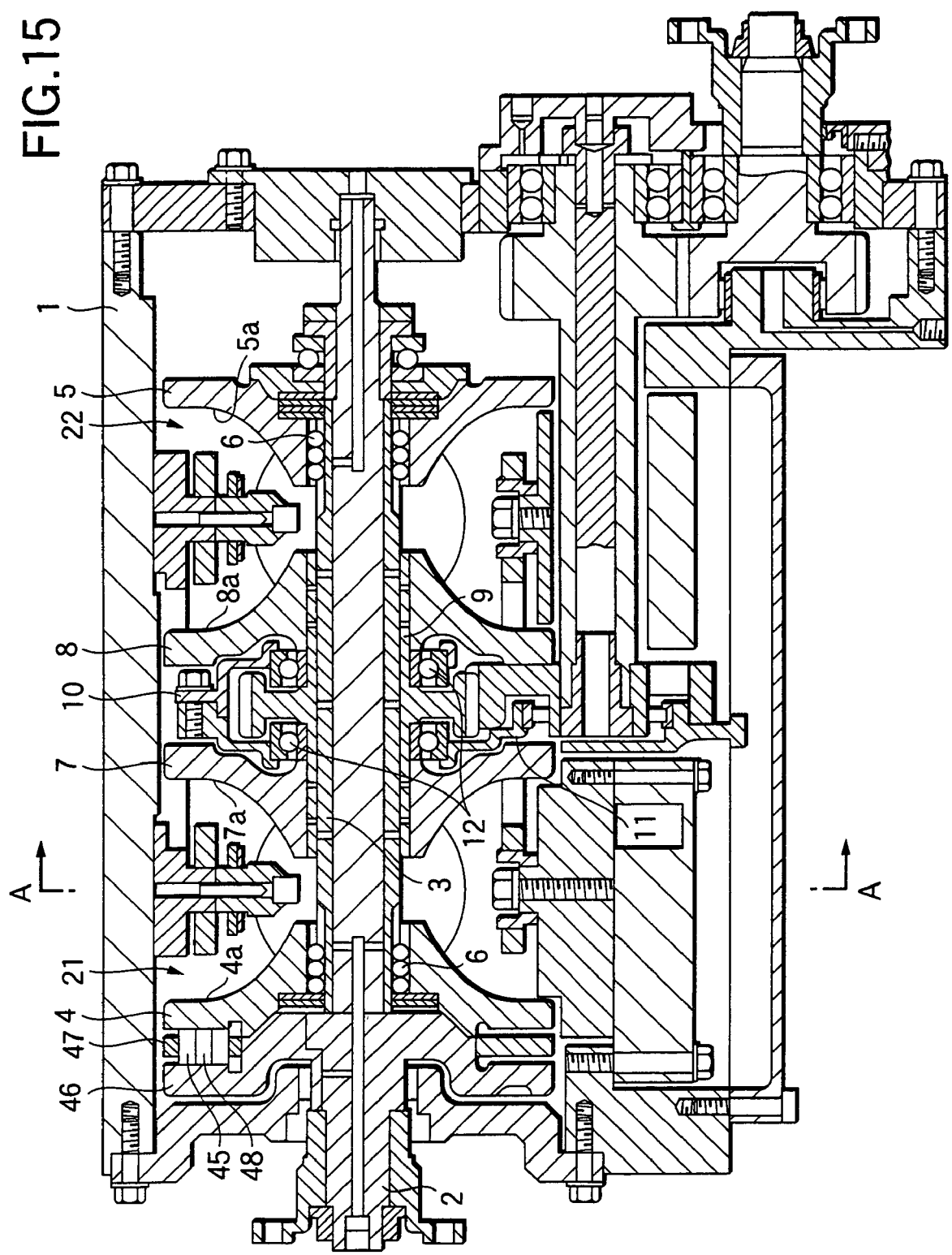
FIG. 15 is a section view of a conventional toroidal-type continuously variable transmission.
Figure 16:
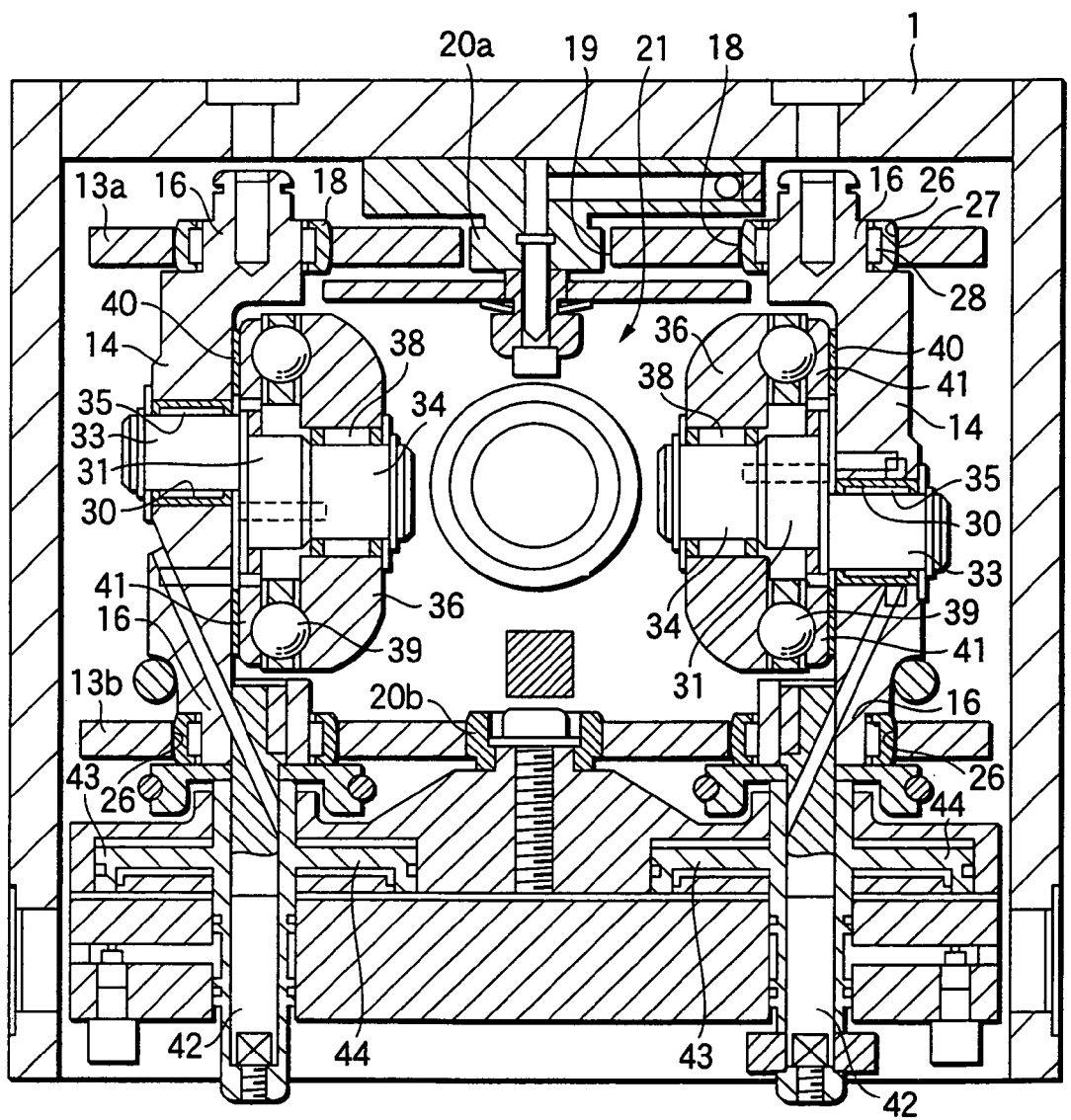
FIG. 16 is a section view taken along the line A—A shown in FIG. 15.

FIGS. 1 and 2 show a first embodiment of a toroidal-type continuously variable transmission according to the invention. That is, FIG. 1 is a section view of the first embodiment, corresponding to the line A—A shown in FIG. 15. FIGS. 2A to 2C show an outer race used in a needle roller bearing; and, specifically, FIG. 2A is a plan view of the outer race, FIG. 2B is a section view taken along the line B—B shown in FIG. 2A, and FIG. 2C is a section view taken along the line C—C shown in FIG. 2A.

As shown in FIG. 1, in the inside portions of a casing 1 that are opposed to each other, there are directly fixed an upper yoke 51 and a lower yoke 52 serving as support members. On the upper and lower yokes 51 and 52, needle roller bearings 53 are disposed respectively. Each of the needle roller bearings 53 is supported by a spherical-surface bearing 50 and supports the pivot shafts 16 of a trunnion 14 in such a manner that the pivot shafts 16 can be shifted in the axial (vertical) direction thereof and in the inclined rotation direction thereof.

That is, each spherical-surface bearing 50 includes an inner race 54 and an outer race 55. The inner and outer races 54 and 55 respectively include spherical surfaces 54a and 55a that can be spherical-surface connected with each other. In the two end portions of the outer race 55, as shown in FIGS. 2A to 2C, a plurality of bolt holes 56 are formed. The outer race 55 is fixed to the upper yoke 51 or lower yoke 52 through bolts 57 respectively inserted into their associated bolt holes 56. In the present embodiment, holes formed in the upper and lower yokes 51 and 52 and the outer races 55 of the spherical-surface bearings are positioned through intermediate-quality fit with high accuracy with respect to the casing 1. By the way, since the positions of the spherical-surface bearings 50 determine the positions of the trunnions 14, the spherical-surface bearings 50 can also be positioned accurately by positioning pins with respect to the upper and lower yokes 51 and 52. In the two portions of the inner peripheral surface of the outer race 55, two cut-out portions 58 are formed. By pressure inserting the inner race 54 into the outer race 55 from the two cut-out portions 58, the inner and outer races 54 and 55 can be united together into an integral body.

And, on the inner race 54 of the spherical-surface bearing 50, the pivot shaft 16 of the trunnion 14 is supported. Since the pivot shaft 16 serves as the rolling surface of the needle roller bearing 53, the pivot shaft 16 is heat treated by high-frequency quenching and the hardness of the pivot shaft 16 is thereby enhanced. Further, in the upper and lower yokes 51 and 52, lubricating oil passages 59 are formed. The lubricating oil passages 59 respectively communicate with the spherical-surface bearings 50 and needle roller bearings 53. In the outer races 55 and pivot shafts 16, oil holes are formed, whereby a sufficient quantity of lubricating oil can be supplied to the spherical-surface bearings 50 and needle roller bearings 53. Also, the lubricating oil passages 59 are formed so as to communicate up to the radial needle roller bearings 35 of the trunnions 14.

Further, since the trunnion 14 is free to shift in the vertical direction thereof, in the portion A between the lower surface of the outer race 55 and the upper surface of the trunnion 14, in the portion B between the upper surface of the outer race 55 and the lower surface of the trunnion 14, in the portion C between the lower surface of the outer race 55 and the upper surface of a pulley 60 for a safety cable, and in the portion D between the pulley 60 for a safety cable and the lower yoke 52, there are formed clearances which correspond to the vertical stroke of the trunnion 14. Since the stroke quantity of the trunnion 14 is determined by the stroke quantity of a drive piston 43, the clearances in the portions A, B, C and D are designed slightly larger than the strokes E, F of the drive pistons 43. Therefore, preventing interference when the trunnion 14 shifts in the vertical direction thereof.

Referring to the order for assembling the trunnion part of the thus structured toroidal-type continuously variable transmission, the upper yoke 51 and the inner and outer races 54, 55 of the spherical-surface bearings 50, while they are united together as an integral body, are assembled into the casing 1. Next, the pivot shafts 16 of the trunnions 14 having the power rollers 36 mounted thereon, are assembled onto the inner races of the spherical-surface bearings 50. Finally, the lower yoke 52, which is united with the inner and outer races 54, 55 of the spherical-surface bearings 50 as an integral body, is assembled into the casing 1 from bottom. Therefore, without making any hole in the casing 1, the trunnion part can be assembled, which can prevent the lowered rigidity of the casing 1.

Also, conventionally, in the case of ball splines which allow the trunnions to move in the vertical direction, depending on the positions of the balls when assembling the trunnion part, a sliding movement and a rolling movement of the balls coexist in each of the balls. This causes the vertical-direction forces of the trunnions to vary unevenly. On the other hand, according to the above-structured toroidal-type continuously variable transmission of the invention, the vertical-direction movements of the trunnions 14 consist only of a single kind of movement, thereby being able to equalize the forces in the respective trunnions 14. Further, when the pivot shafts 16 of the trunnions 14 are shifted in the vertical direction thereof, the trunnions 14 are rotated about the pivot shafts 16 simultaneously with the vertical-direction shifting movements of the pivot shafts 16. Therefore, the movements of the trunnions 14 provide rolling movements although they include slight degrees of sliding movements. This can reduce the frictional forces much more than a simple sliding movement, thereby being able to enhance the synchronization and stability of the movements of the trunnions in the gear change operation.

Figure 3:
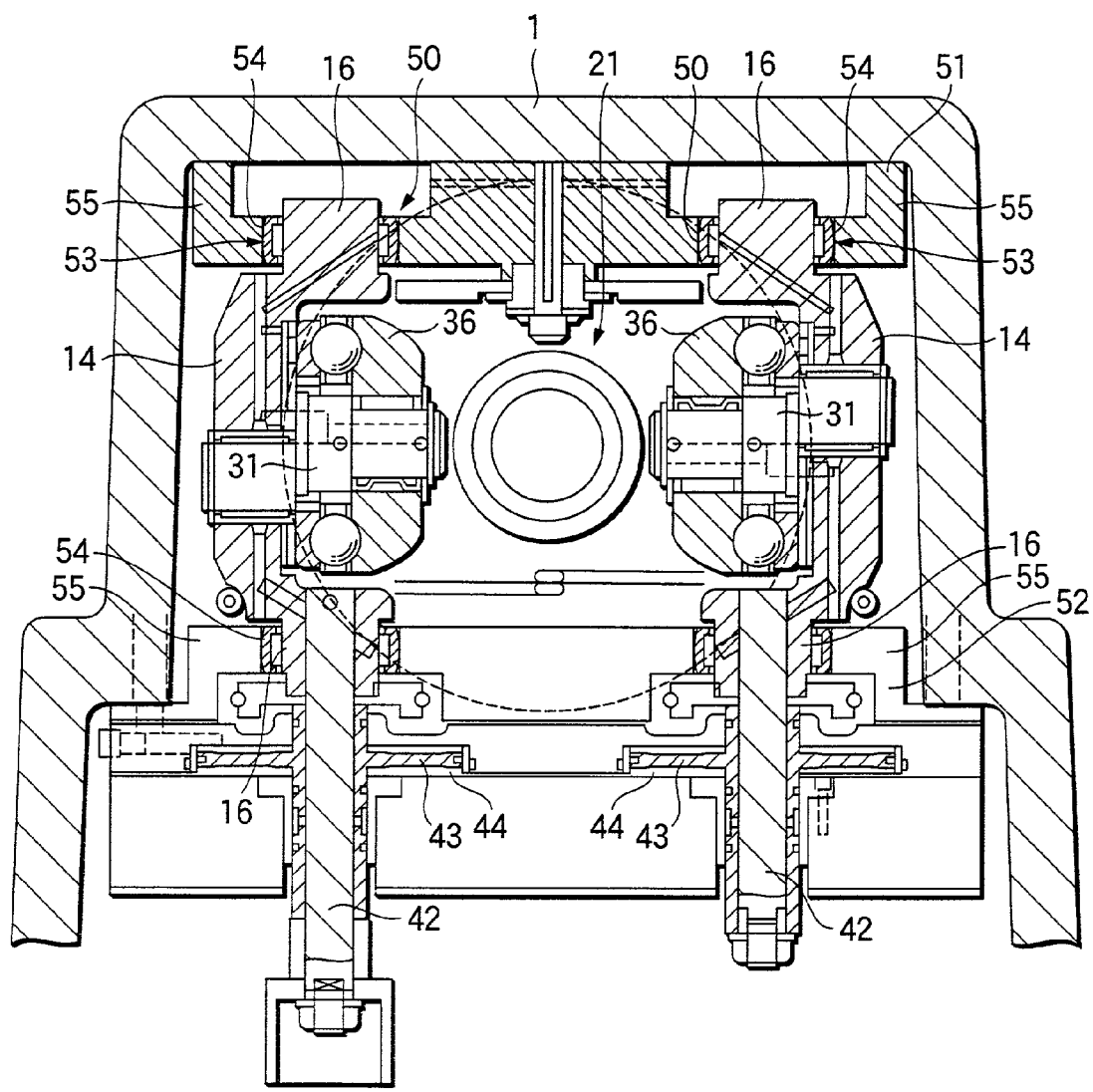
FIG. 3 shows a toroidal-type continuously variable transmission according to a second embodiment of the invention, specifically, a section view thereof corresponding to the section view taken along the line A—A shown in FIG. 15.

Now, FIG. 3 shows a second embodiment of a toroidal-type continuously variable transmission according to the invention. In the second embodiment, parts having the same structures as the first embodiment are given the same designations and thus the description thereof is omitted. In the present embodiment, the upper and lower yokes 51 and 52 are united with the outer races 55 of the spherical-surface bearings 50 as an integral body. This not only can omit time and labor for fixing the outer races 55 to the upper and lower yokes 51 and 52 using the bolts 57 but also can reduce the number of parts.

Figure 4:
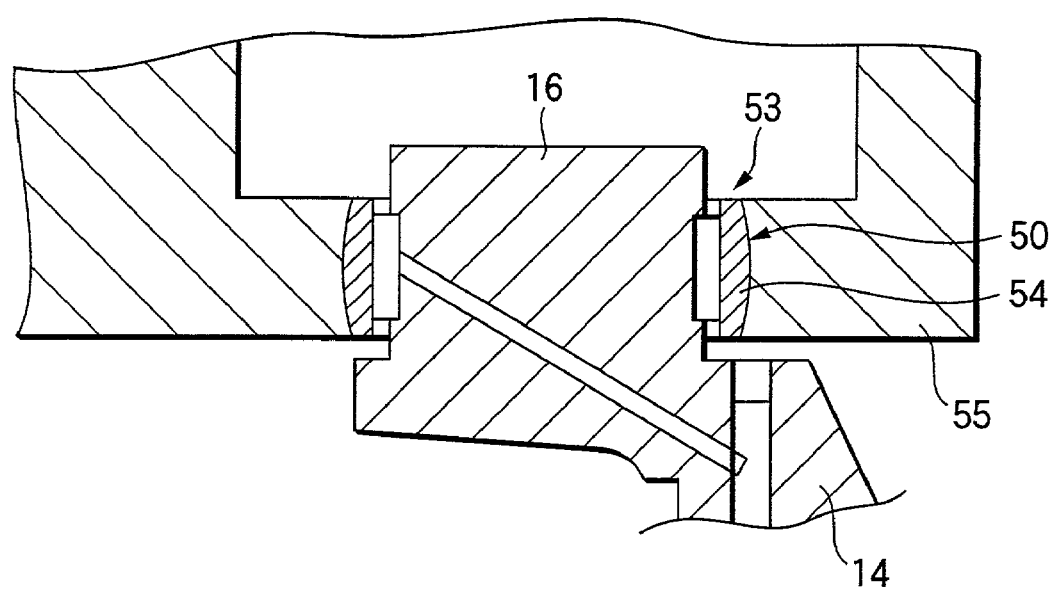
FIG. 4 is a section view of a support structure of a pivot shaft of a trunnion employed in a toroidal-type continuously variable transmission according to a third embodiment of the invention.

FIG. 4 shows a third embodiment of a toroidal-type continuously variable transmission according to the invention. In the third embodiment, parts having the same structures as the first embodiment are given the same designations and thus the description thereof is omitted. In the first embodiment, when the trunnions 14 shift in the vertical direction, they slide between the pivot shafts 16 of the trunnions 14 and the needle roller bearings 53. On the other hand, in the present embodiment, when the trunnions 14 shift in the vertical direction, they slide between the needle roller bearings 53 and the inner races 54 of the spherical-surface bearings 50.

Figure 5:
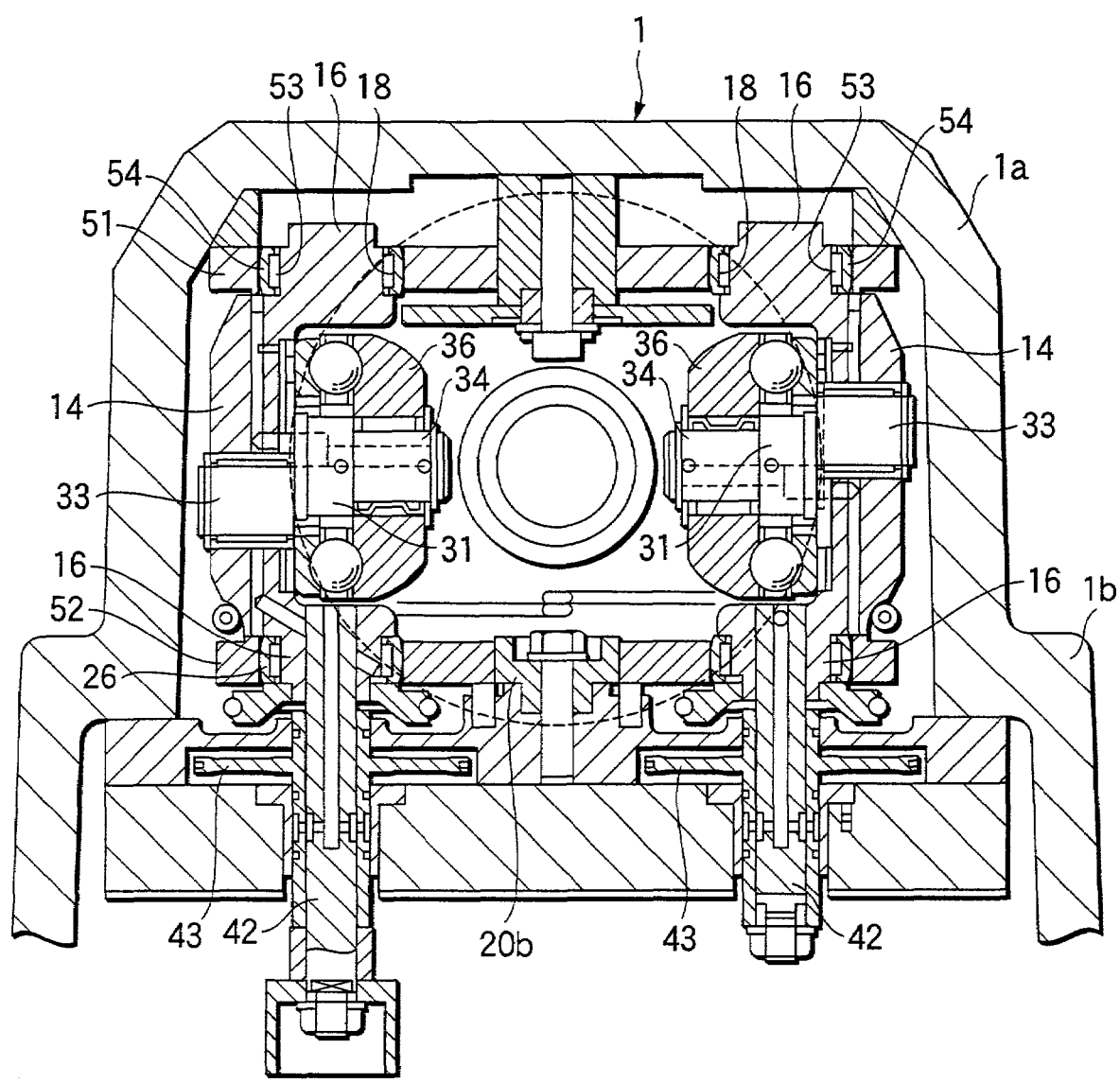
FIG. 5 is a longitudinal section view of a toroidal-type continuously variable transmission according to a fourth embodiment of the invention.

Now, FIG. 5 shows a fourth embodiment of a toroidal-type continuously variable transmission according to the invention. In the fourth embodiment, on the inner surface of the casing 1, more specifically, laterally of the first and second output disks 7, 8, there are supported an upper yoke 51 and a lower yoke 52 in such a manner that they hold the two disks 7, 8 from both sides.

The upper yoke 51 is fixed to the inner wall of the casing 1 (the inner wall of the casing upper portion 1a) through a fixing member, whereas the lower yoke 52 is swingably disposed within the inner space of the casing lower portion 1b.

In the four corners of the upper yoke 51, there are formed support holes 18 respectively and, in each of the four support holes 18, there is disposed a needle roller bearing 53. The needle roller bearing 53 is supported by a spherical-surface bearing 54 in contact with the inner periphery of the support hole 18. Whereby, the upper pivot shaft 16 of the trunnion 14 is supported in such a manner that it can be shifted not only in the axial direction (vertical direction) thereof but also in the inclined rotation direction thereof.

According to the above-structured toroidal-type continuously variable transmission, since the upper yoke 51 is fixed to the inner wall of the casing upper portion 1a, there is eliminated the need for securing a space for swinging the yoke as in the conventional toroidal-type continuously variable transmission. Therefore, this structure is ideal for the case where, as in an FR vehicle, the upper portion of the casing 1 must be made compact in order to be able to secure living space within the vehicle. Namely, it is ideal for the casing 1 in which, as shown in FIG. 5, the inside space of the casing upper portion 1a is narrower than the inside space of the casing lower portion 1b.

Also, since the upper yoke 51 is fixed to the inner wall 1a of the casing upper portion 1a, the number of parts is reduced, which makes it possible to facilitate the manufacturing of the parts, managing of the parts and assembling of the parts.

Further, since no limitation is put on the dimension of the lower portion of the casing and, as in the present embodiment, the lower yoke 52 of an a winging type can be mounted into the inside space of the casing lower portion 1b. When compared with the toroidal-type continuously variable transmission which is disclosed in Japanese Patent Unexamined Publication 2000-9200 and in which all yokes are fixed directly to the inside of the casing, the synchronizing movements of all trunnions 14 in the vertical direction in the gear change operation can be guaranteed with more accuracy.

Also, the yoke has a function to cancel the thrust force applied from the four power rollers 36 within the yoke, which makes it necessary that the yoke is formed as thick and large as possible. However, the fixation of the upper yoke 51 to the casing 1 eliminates the provision of the support post and the portion, from which the support post has been eliminated, can be used to increase the thickness of the yoke 51. This makes it possible to enhance the durability of the upper yoke 51.

Figure 6:
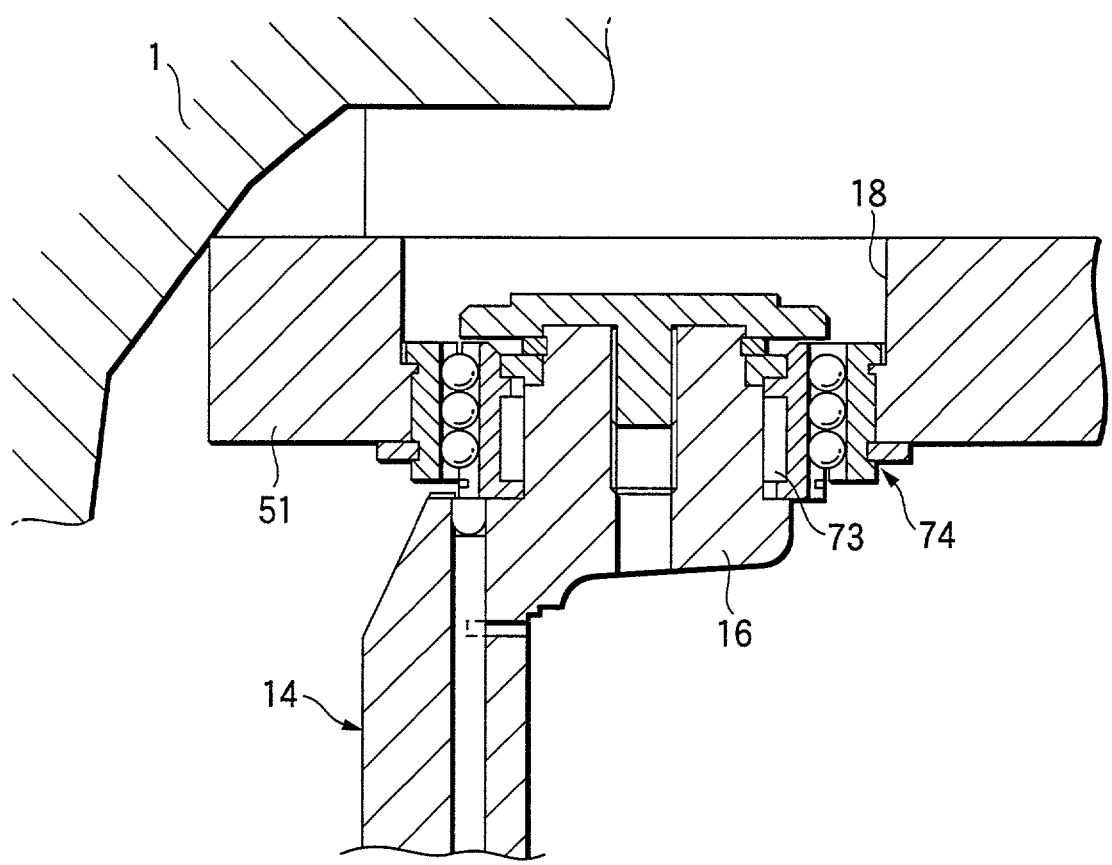
FIG. 6 is a section view of a structure for supporting an upper pivot shaft of a trunnion employed in a toroidal-type continuously variable transmission according to a fifth embodiment of the invention.

Next, FIG. 6 shows a fifth embodiment of a toroidal-type continuously variable transmission according to the invention. In FIG. 6, there is shown how to support the upper pivot shaft 16 of the trunnion 14. Specifically, in the present embodiment, the upper pivot shaft 16 is supported in the support hole 18 of the upper yoke 51 by a radial roller bearing 73 and a ball spline 74 disposed on the outer periphery of the radial roller bearing 73 in such a manner that it can be not only swung and shifted but also shifted in the axial direction (vertical direction) thereof. According to this structure, the trunnion 14 can be shifted smoothly in the axial direction of the upper pivot shaft 16.

By the way, in the embodiments respectively shown in FIGS. 5 and 6, the upper yoke 51 is fixed to the casing 1 and the lower yoke 52 is formed so as to be swingable. However, for example, when a larger dimensional limit is put on the lower portion of the casing 1 than on the upper portion thereof, in case where the upper yoke is formed so as to be swingable and the lower yoke is fixed to the casing 1 to thereby be able to escape from the dimensional limit. Therefore, there can be obtained a similar effect to the previously-described embodiments.

Figure 7:
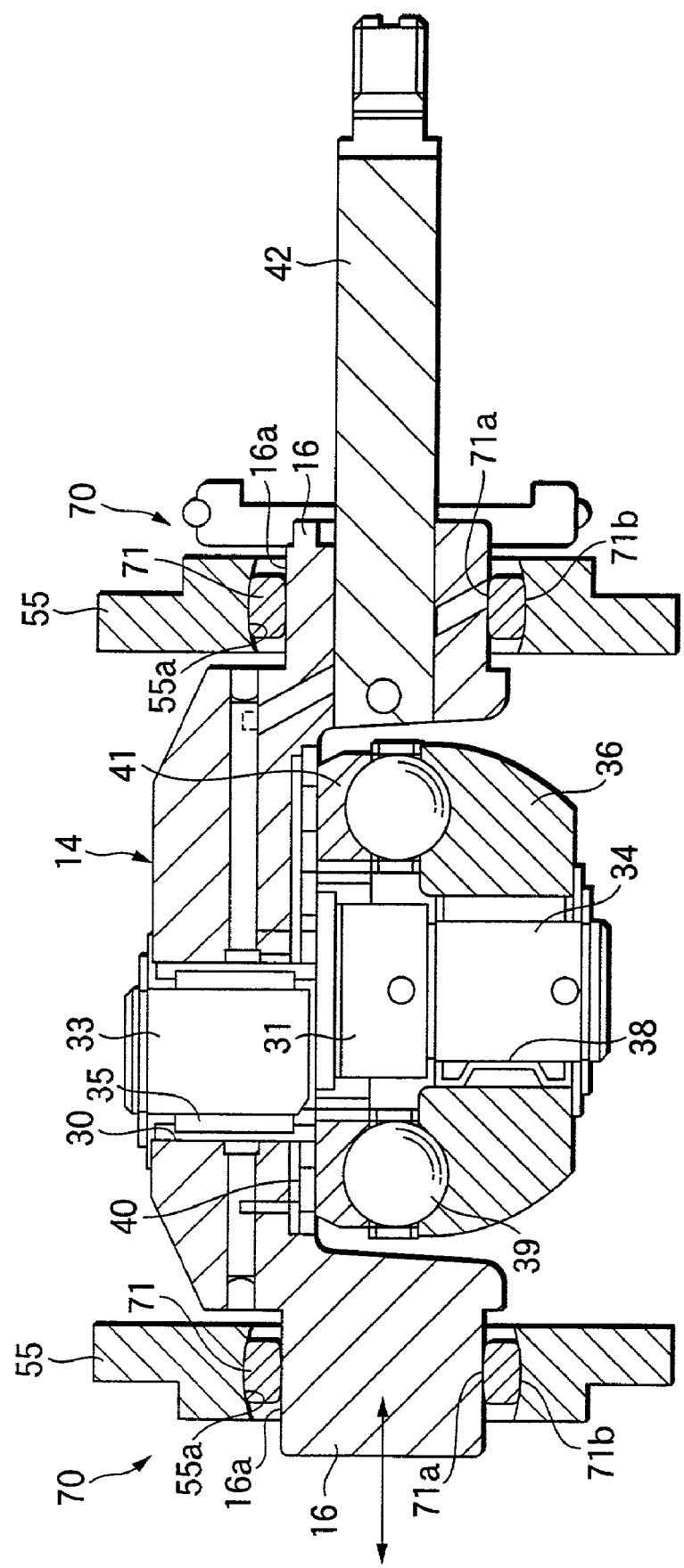
FIG. 7 is a section view of the main portions of a toroidal-type continuously variable transmission according to a sixth embodiment of the invention.

Now, FIG. 7 shows a sixth embodiment of a toroidal-type continuously variable transmission according to the invention. The present embodiment is characterized in that the pivot shaft of the trunnion is supported in such a manner that, even the trunnion is deformed when the toroidal-type continuously variable transmission is in operation, the deformation of the trunnion cannot have any ill influence on the gear change operation. In detail, on yokes 51, 52 (see FIGS. 1 and 7) fixed directly to the inside of the casing 1, pivot shafts 16 mounted on the two end portions of the trunnion 14 are supported in such a manner that the pivot shafts 16 can be shifted not only in the axial direction (the vertical direction, that is, in FIG. 7, a direction shown by arrow marks) but also in the inclined rotation direction through their respective bearings 70 which have the characteristic members of the invention. Each of the bearings 70 is composed of an outer race 55 fixed to its corresponding yoke 51 or 52, an inner race 16a formed by the outer peripheral surface of the pivot shaft 16 of the trunnion 14, and barrel-shaped rollers rollably interposed between the outer and inner races 55 and 16a. In this case, the raceway surface of the inner race 16a is formed in a linear-shaped (straight-shaped) surface. Also, the raceway surface 55a of the outer race 55 is formed as a curved surface having a radius of curvature R. Further, the outer surface 71a of the roller 71 to be contacted with the inner race 16a, and the outer surface 71b of the roller 71 to be contacted with the outer race 55, are respectively formed as a curved surface having a radius of curvature r.

In the present structure, since the rollers 71 are embraced by the curved surface of the outer race 55 having a radius of curvature R, in the gear change operation, the movement of the trunnion 14 in the axial direction (vertical direction) is not made between the rollers 71 and outer race 55. Therefore, the axial-direction (vertical-direction) movement of the trunnion 14 is made between the straight-surface shaped inner race 16 and rollers 71.

As described above, according to the present embodiment, the vertical-direction movement of the trunnion 14 is made only on the inner race 16 side. That is, the vertical-direction movement of the trunnion 14 is made not on the outer race 55 side, where the contact area of the outer race 55 with the rollers 71 increases due to the spherical-surface contact between the R curved surface and r curved surface. The vertical-direction movement of the trunnion 14 is made on the inner race 16a side where the contact area of the inner race 16a with the rollers 71 decreases due to the point contact between the straight-shaped rolling surface and the r curved surface. For this reason, there is reduced the dynamic friction of the trunnion 14 when the trunnion 14 moves in the vertical direction thereof, which makes it possible to stabilize the gear change operation. That is, in case where the raceway surface 55a of the outer race 55 is formed as a curved surface having a radius of curvature R and the raceway surface of the inner race 16a is formed as a straight-surface-shaped surface, the skew of the trunnion can be reduced.

Figure 17:
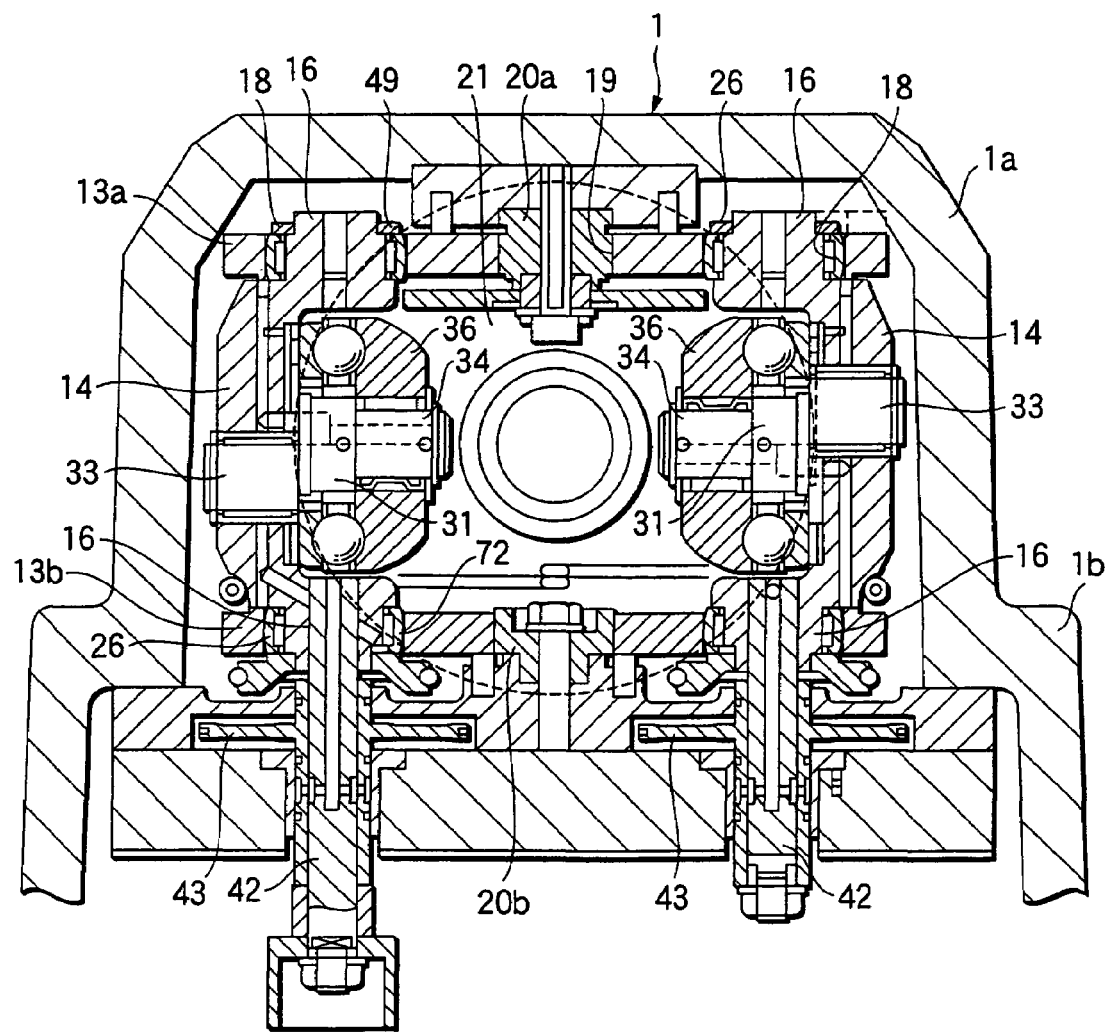
FIG. 17 is a section view of another conventional toroidal-type continuously variable transmission, corresponding to the section view shown in FIG. 16.
Figure 19:
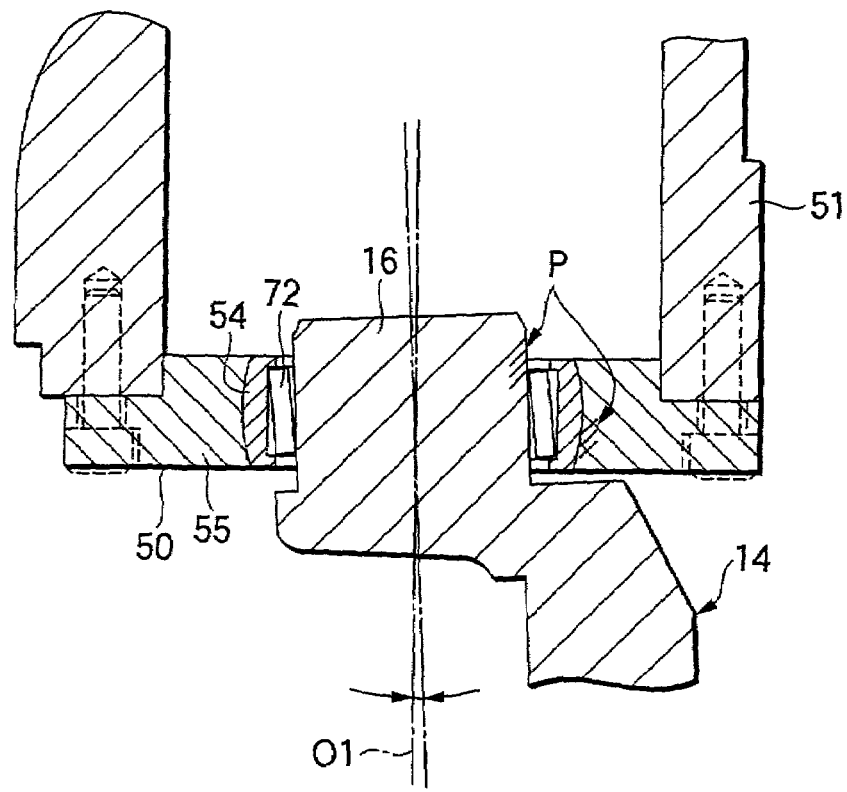

Also, in the present embodiment, the roller 71, which is involved in the axial-direction movement and swung rotation of the trunnion 14, is formed as a barrel-shaped roller 71 having a radius of curvature r. Therefore, even in case where the trunnion 14 is elastically deformed, the self-alignment of the trunnion 14 is achieved excellently by the barrel-shaped roller 71. Namely, as shown in FIG. 17, according to the conventional toroidal-type continuously variable transmission, the roller for supporting the pivot shaft of the trunnion 14 is a needle roller 72 having in the end portion thereof a crowning of the order of several microns. Then, an edge load is easy to be applied to the needle roller. On the other hand, according to the present embodiment, since the roller 71 is a barrel-shaped roller, such an edge load as shown in FIG. 19 can be prevented from being applied to the roller, which makes it possible to carry out the gear change operation with high accuracy.

Also, according to the present embodiment, since the vertical-direction movement, inclined rotation and elastic deformation of the trunnion 14 in the gear change operation are received only by the bearing 70, in other words, the vertical-direction movement, inclined rotation and elastic deformation of the trunnion 14 are received substantially only by the outer race 55 and roller 71, the number of parts is reduced and the structure is simplified. Especially, this arrangement is useful in a structure in which, as in the present embodiment, the yokes 51, 52 are fixed directly to the casing 1. Namely, with use of this arrangement, the number of parts can be reduced, the parts manufacturing operation, parts managing operation and parts assembling operation can be simplified. In addition, the height dimensions of the toroidal-type-continuously variable transmission can be reduced further, thereby being able to promote reduction in the size and weight of the toroidal-type continuously variable transmission over the conventional toroidal-type continuously variable transmission.

Figure 9:
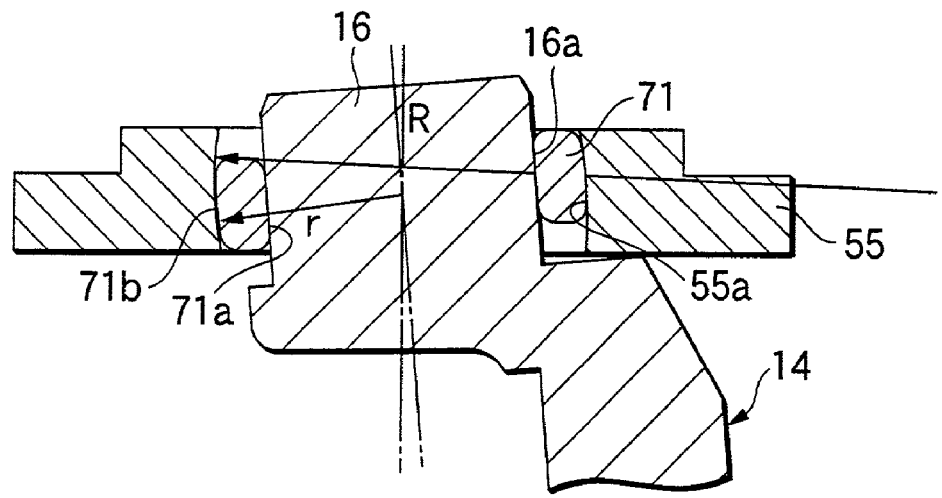
FIG. 9 is an enlarged view of the main portions of the structure shown in FIG. 7.

By the way, in the present embodiment, as shown in FIG. 9, the radius of curvature R of the raceway surface of the outer race 55 may also be set larger than the radius of curvature r of the outer peripheral surfaces (71b, 71a) of the rollers 71.

Figure 8:
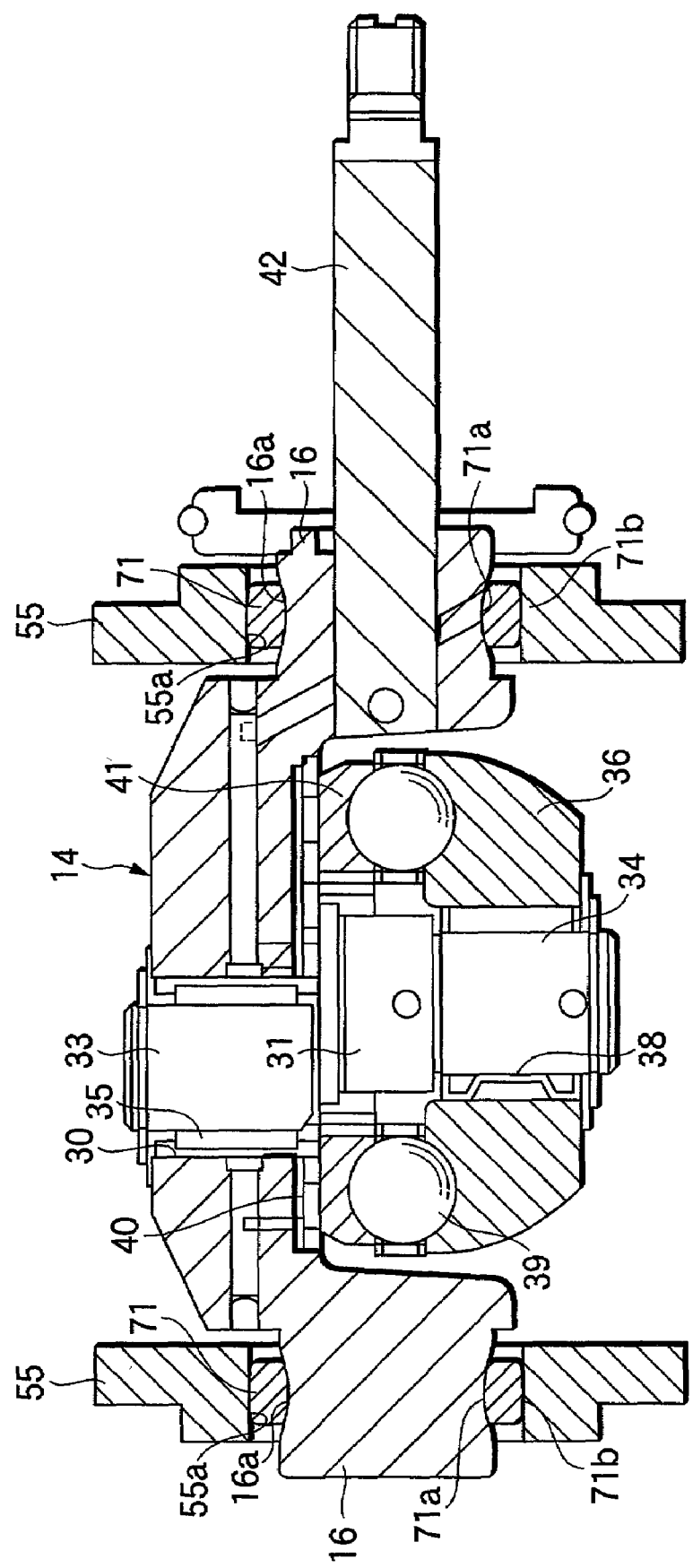
FIG. 8 is a section view of the main portions of a toroidal-type continuously variable transmission according to a seventh embodiment of the invention.

Now, FIG. 8 shows a seventh embodiment of a toroidal-type continuously variable transmission according to the invention. By the way, in the present embodiment, parts used in common with the sixth embodiment are given the same designations and thus the description thereof is omitted here.

As shown in FIG. 8, in the present embodiment, the shape of the raceway surface is reversed with respect to the sixth embodiment. That is, the raceway surface of the inner race 16a holding the roller 71 is formed as a curved surface having the radius of curvature R, whereas the raceway surface 55a of the outer race 55 holding the roller 71 is formed as a linear-shaped (that is, straight-shaped) surface. Also, the outer peripheral surface 71a of the roller 71 to be contacted with the inner race 16a, and the outer peripheral surface 71b of the roller 71 to be contacted with the outer race 55, are both formed as a curved surface having the radius of curvature r.

In this arrangement, since the roller 71 is embraced by the curved surface of the inner race 16a having the radius of curvature R, in the gear change operation, the axial-direction (vertical-direction) movement of the trunnion 14 is not made between the roller 71 and inner race 16a. Therefore, the axial-direction (vertical-direction) movement of the trunnion 14 is made between the straight-surface-shaped outer race 55 and the roller 71.

In this manner, the vertical-direction movement of the trunnion 14 is made only on the outer race 55 side where the contact area is small. This can reduce the dynamic friction of the trunnion 14 in the vertical-direction movement of the trunnion 14, which leads to the stabilized gear change operation. Also, generally, in a bearing, the inner race side thereof is severer in the surface pressure than the outer race side thereof, under the using condition where the surface pressure is severe. Therefore, since the raceway surface of the inner race 16a is formed as a curved surface having the radius of curvature R and the raceway surface 55a of the outer race 55 is formed so as to be a straight-shaped surface, the surface pressure of the bearing can be reduced.

Figure 10:
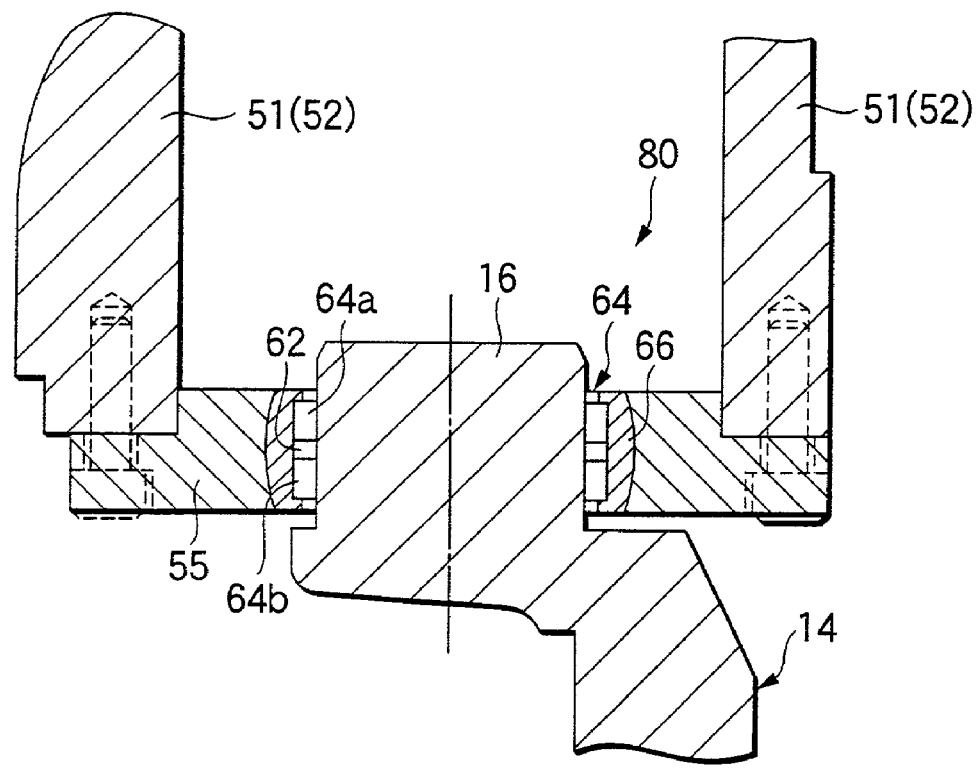
FIG. 10 is a section view of the main portions of a toroidal-type continuously variable transmission according to an eighth embodiment of the invention.

Now, FIG. 10 shows an eighth embodiment of a toroidal-type continuously variable transmission according to the invention. By the way, in the present embodiment, parts used in common with the sixth embodiment are given the same designations and thus the description thereof is omitted here.

As shown in FIG. 10, in the present embodiment, the pivot shafts 16 disposed on the two end portions of the trunnion 14 are supported on the yokes 51, 52 through the needle roller bearing (needle roller) 64 and spherical-surface bearing 80 in such a manner that the pivot shafts 16 can be shifted in the axial direction (vertical direction) thereof and in the inclined rotation direction thereof. In this case, the spherical-surface bearing 80 includes outer races 55 which are respectively fixed to their corresponding yokes 51 and 52. Also, the needle roller 64 has such a shape that can be obtained when the conventional needle roller 72 shown in FIG. 17, and is divided into two parts in the axial direction of the pivot shaft 16. The thus-divided two needle rollers 64a and 64b include a spacer 62 interposed between them, and are supported by a retainer (inner race) 66 which is used to facilitate the assembling of the needle roller 64. By the way, in the present embodiment, there is shown an example in which the needle roller 64 is divided into two parts. However, the invention is not limited to such division-into-two-parts but the needle roller 64 may only be divided into two or more parts.

As described above, in case where the needle roller 64 is divided into two parts, not only the edge load of the trunnion 14 can be reduced, but also the gear change operation of the trunnion 14 can be carried out smoothly.

Figure 11:
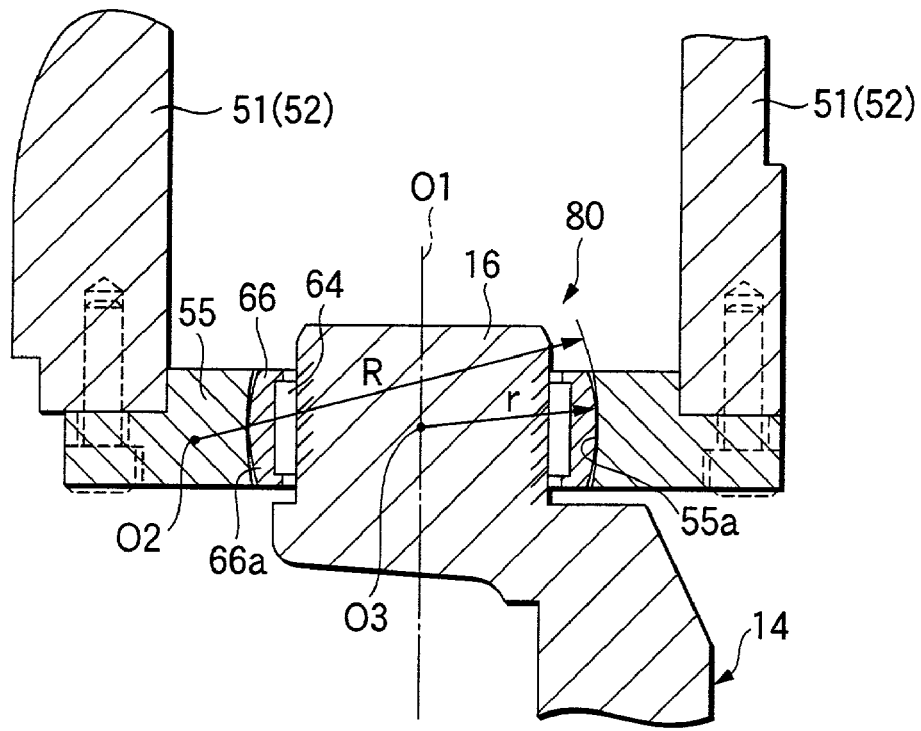
FIG. 11 is a section view of the main portions of a toroidal-type continuously variable transmission according to a ninth embodiment of the invention.

Now, FIG. 11 shows a ninth embodiment of a toroidal-type continuously variable transmission according to the invention. By the way, in the present embodiment, parts used in common with the sixth and eighth embodiments are given the same designations and thus the description thereof is omitted here.

As shown in FIG. 11, in the present embodiment, the needle roller 64 (as shown in the eighth embodiment) is not divided into two parts. However, the connecting surface 66a of the inner race 66 of the spherical-surface bearing 80 is formed as a curved surface having the radius of curvature r. The connecting surface 55a of the outer race 55 of the spherical-surface bearing 80 is formed as a curved surface having the radius of curvature R. In this case, the center of curvature O3 of the connecting surface 66a of the inner race 66 exists on the inclined rotation axis O1 of the trunnion 14. However, the center of curvature O2 of the connecting surface 55a of the outer race 55 does not exist on the inclined rotation axis O1 of the trunnion 14, so that r<R (R is larger than r). In the case of such structure, the elastic deformation of the trunnion 14 can be absorbed easily.

Figure 12:
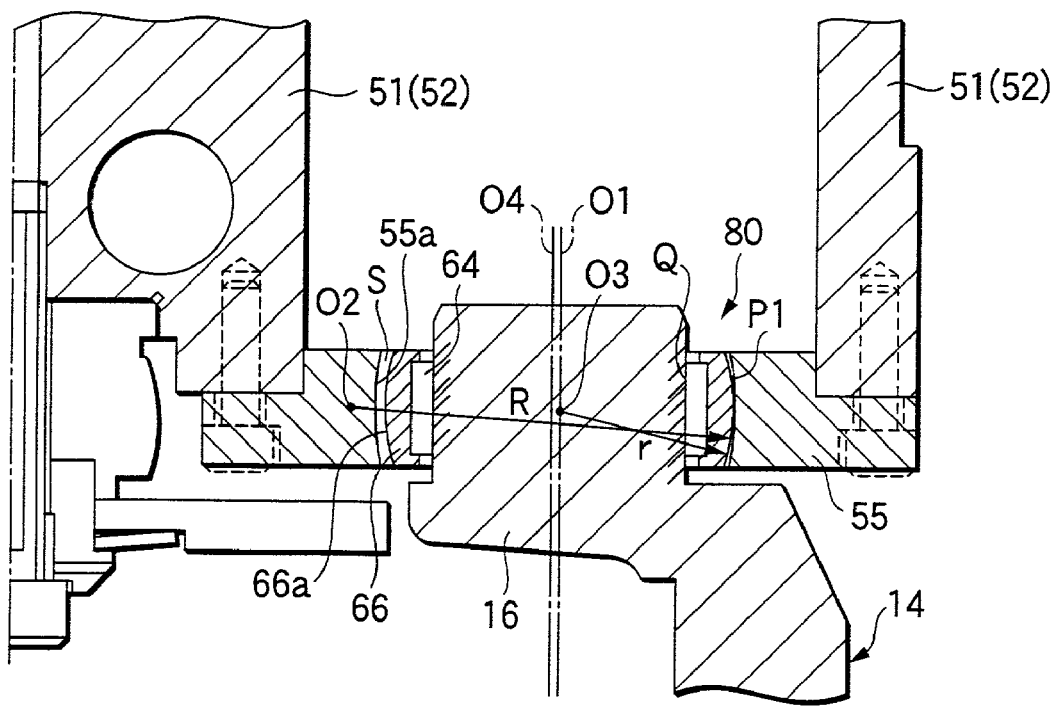
FIG. 12 is a section view of the main portions of a toroidal-type continuously variable transmission according to a first example of a tenth embodiment of the invention.
Figure 13:
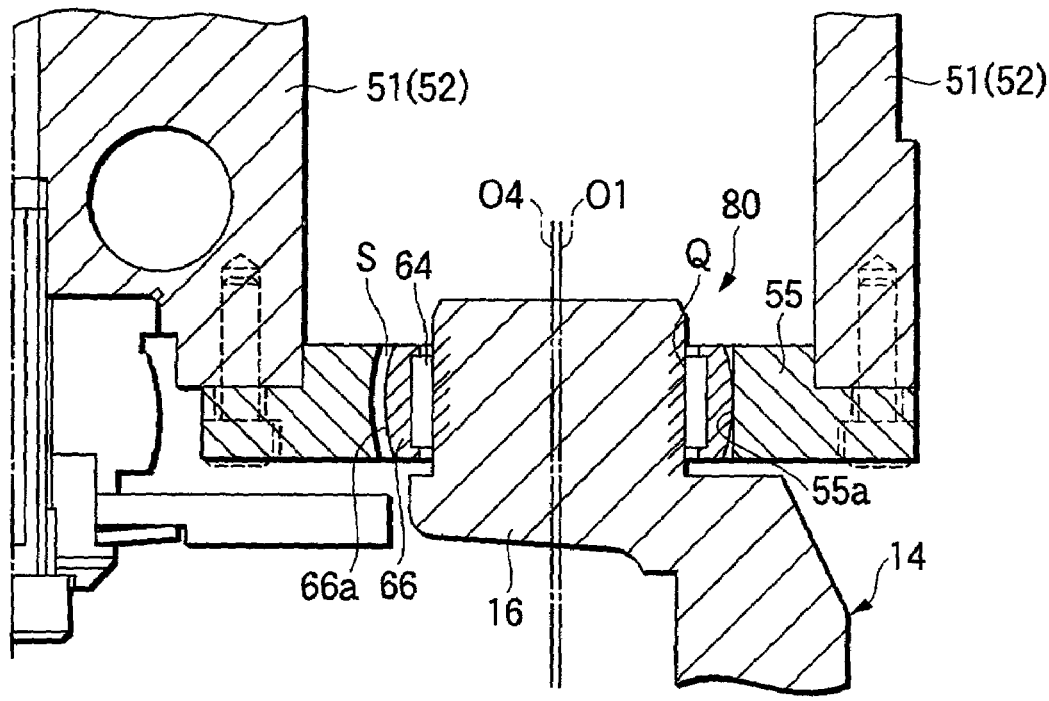
FIG. 13 is a section view of the main portions of a toroidal-type continuously variable transmission according to a second example of the tenth embodiment of the invention.
Figure 14:
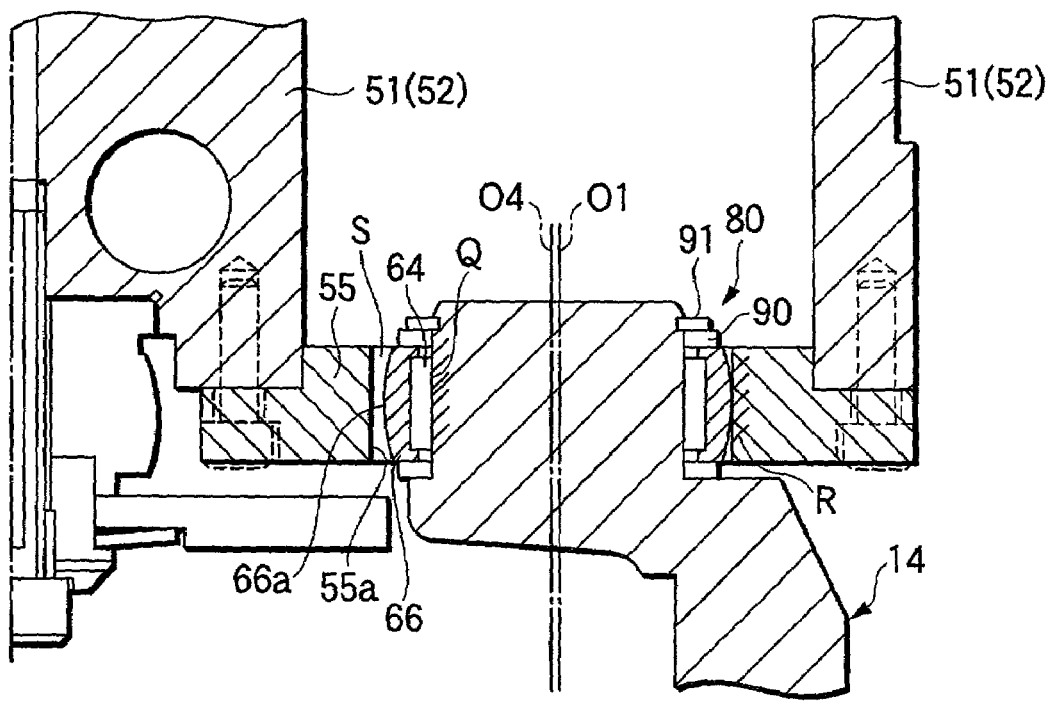
FIG. 14 is a section view of the main portions of a toroidal-type continuously variable transmission according to a third example of the tenth embodiment of the invention.

Now, FIGS. 12 to 14 show a tenth embodiment of a toroidal-type continuously variable transmission according to the invention. By the way, in the present embodiment, parts used in common with the ninth embodiment are given the same designations and thus the description thereof is omitted here.

FIG. 12 shows a first example of the tenth embodiment. In the first example of the tenth embodiment, in addition to the structure of the ninth embodiment, between the inner race 66 and outer race 55, a clearance S is formed. Namely, the center axis O4 of the outer race 55 of the spherical-surface 80 is offset with respect to the inclined rotation axis O1 of the trunnion 14.

According to this structure, in the connecting surface (in FIG. 12, the Q portion that is shown by oblique lines) between the outer peripheral surface of the pivot shaft 16 of the trunnion 14 and the needle roller 64, the vertical-direction movement and inclined rotation of the trunnion 14 are made. In addition, the contact between the inner race 66 and outer race 55 is made only at the point P1.

Also, in the case of a second example of the tenth embodiment shown in FIG. 13, between the inner race 66 and outer race 55, a clearance S is formed. The center axis O4 of the outer race 55 of the spherical-surface bearing 80 is offset with respect to the inclined rotation axis O1 of the trunnion 14. However, the radius of curvature of the connecting surface 66a of the inner race 66 is set equal to the radius of curvature of the connecting surface 55a of the outer race 55. In the case of the second example, the vertical-direction movement and inclined rotation of the trunnion 14 are made on the connecting surface (in FIG. 13, the Q portion shown by oblique lines) between the needle roller 64 and the outer peripheral surface of the pivot shaft 16 of the trunnion 14.

Further, in a third example of the tenth embodiment shown in FIG. 14, between the inner race 66 and outer race 55, a clearance S is formed. The center axis O4 of the outer race 55 of the spherical-surface bearing 80 is offset with respect to the inclined rotation axis O1 of the trunnion 14. However, the connecting surface 55a of the outer race 55 is formed so as to be a straight-shaped surface. In the case of this structure, the vertical-direction movement of the trunnion 14 is made on the contact portion (in FIG. 14, the R portion shown by oblique lines) between the straight-shaped connecting surface 55a of the outer race 55 and the connecting surface 66a of the inner race 66. On the other hand, the inclined rotation of the trunnion 14 is made on the connecting surface (in FIG. 14, the Q portion shown by oblique lines) between the needle roller 64 and the outer peripheral surface of the pivot shaft 16 of the trunnion 14. By the way, in FIG. 14, reference character 90 designates a spacer and reference character 91 stands for a retaining ring.

Figure 18:
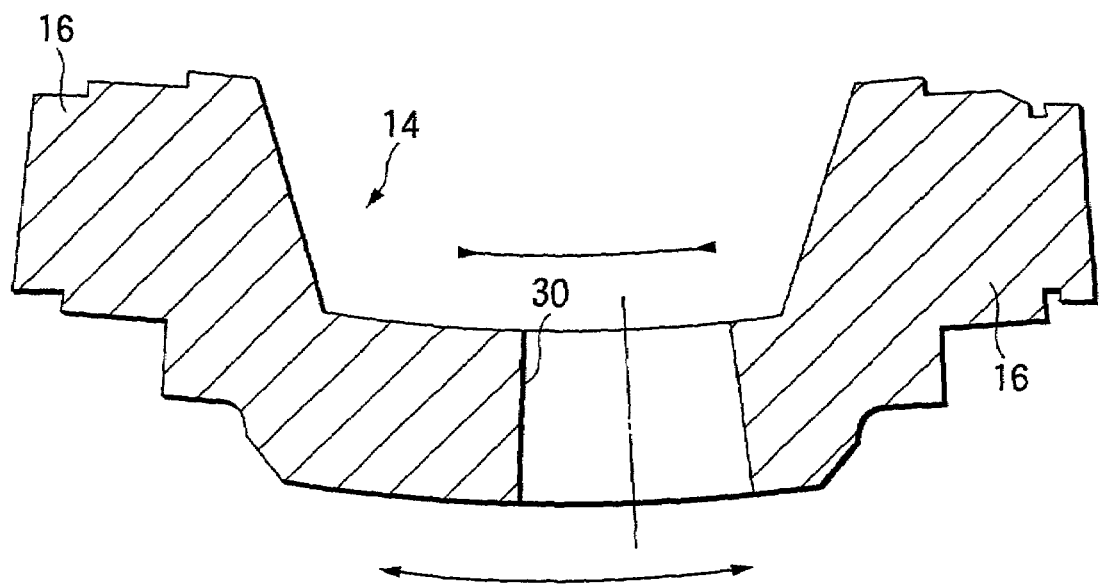
FIG. 18 is a section view of a trunnion, explaining the elastic deformation of the trunnion; and, FIG. 19 is a section view of the trunnion shown in FIG. 17, showing a state in which the trunnion is elastically deformed.

As described above, in the present embodiment (the three examples thereof), between the inner race 66 and outer race 55, a clearance S is formed. In addition, the center axis O4 of the outer race 55 of the spherical-surface bearing 80 is offset with respect to the inclined rotation axis O1 of the trunnion 14. Therefore, when the trunnion 14 is deformed as shown in FIG. 18, the elastic deformation of the trunnion 14 is absorbed by the clearance S formed between the inner race 66 and outer race 55. Namely, even in case where the trunnion 14 is elastically deformed, the elastic deformation of the trunnion 14 has no ill influences on the gear change operation.

As described heretofore, according to the invention, the pivot shaft of the trunnion is supported on the support member in such a manner that it can be shifted in the axial direction thereof and in the inclined rotation direction thereof. Therefore, the number of parts can be reduced and the assembling operation of the parts can be facilitated. Also, when the pivot shaft of the trunnion moves in the vertical direction thereof, the trunnion rotates about the pivot shaft of the trunnion simultaneously with the vertical-direction movement of the pivot shaft of the trunnion. Namely, the trunnion provides a rolling movement. Therefore, reducing the frictional force of the trunnion greatly. Thanks to this, the vertical-direction movements of the respective trunnions can be made uniform and, in the gear change operation, the synchronization and stability of the vertical-direction movements of the respective trunnions can be enhanced.

Also, according to the invention, one of the upper support member and lower support member is fixed directly to the casing, and the other of the upper and lower support member is supported so as to be swingable. Therefore, not only the number of parts can be reduced, but also the parts manufacturing operation, parts managing operation and parts assembling operation can be facilitated respectively.

And, since the support member has a function to cancel the thrust force applied from the power roller, it is necessary to increase the thickness of the support member as much as possible. However, the direct fixation of one of the upper and lower support member to the casing eliminates the provision of a support post. Thus, the support post elimination portion can be used to increase the thickness of the support member. This can enhance the durability of the support member fixed to the casing.

Further, according to the invention, since the upper support member is fixed to the inner wall of the casing, the need for provision of a space for swinging the support member is eliminated as in the conventional toroidal-type continuously variable transmission. Therefore, the present structure is ideal for the case where the upper portion of the casing must be formed compact so as to be able to secure living space within the vehicle, for example in a vehicle of an FR type. Because, the inside space of the upper portion of the casing is formed narrower than the inside space of the lower portion of the casing.

Moreover, in the case of the vehicle of an FR type, no dimensional limit is placed on the lower portion of the casing and thus the lower support member of an swinging type is mounted into the inside space of the lower portion of the casing. This makes it possible to guarantee the synchronization of the vertical-direction movements of all trunnions in the gear change operation.

In addition, according to the invention, since the roller is embraced by the curved surface of the outer race, the axial-direction movement of the trunnion is made only on the inner race side thereof. That is, the axial-direction movement of the trunnion is made not on the outer race side where the contact area of the trunnion with the roller is increased due to the spherical-surface contact thereof, but on the inner race side where the contact area of the trunnion with the roller is decreased due to the point contact between the curved surface and the straight-shaped rolling surface. For this reason, the dynamic friction of the trunnion in the axial-direction movement of the trunnion can be reduced, thereby being able to stabilize the gear change operation.

Also, according to the invention, the axial-direction movement of the trunnion is made only on the outer race side where the contact area of the trunnion is small. Therefore, the dynamic friction of the trunnion in the axial-direction movement of the trunnion can be reduced, thereby being able to stabilize the gear change operation. Also, generally, in a conventional bearing, since the inner race side thereof is severer in the surface pressure than the outer race side thereof, under the using condition where the surface pressure is severe. In the case, as described above, where the raceway surface of the inner race is formed as a curved surface and the raceway surface of the outer race is formed as a straight-shaped surface, the surface pressure can be lowered.

According to the invention, since the needle roller is divided into two parts, not only the edge load can be reduced, but also the gear change operation of the trunnion can be carried out smoothly.

According to the invention, the elastic deformation of the trunnion can be absorbed easily.

According to the invention, when the trunnion is deformed elastically, the elastic deformation of the trunnion is absorbed by a clearance formed between the inner and outer races. Therefore, even in case where the trunnion is deformed, the deformation of the trunnion has no ill influences on the gear change operation.

What is claimed is:

1. A toroidal continuously variable transmission comprising:

a casing;

input and output disks respectively including inner surfaces, disposed concentrically with each other inside said casing, and supported in such a manner that they are rotated independently of each other;

a plurality of trunnions each including even-numbered pivot shafts existing at twisted positions which are at right angles to a central-axis direction of said input and output disks and disposed concentrically with to in parallel to each other, and being swingable about said pivot shafts;

a plurality of shift shafts respectively projected out from inner surfaces of said trunnions;

a plurality of power rollers held by and between respective facing inner surfaces of said input and output disks in such a manner that they are rotatably supported on said shift shafts; and a support member fixed directly to said casing and supporting said pivot shafts of said trunnions in such a manner that they are shifted in an axial direction thereof and in an inclined rotation direction thereof;

a plurality of needle roller bearings for supporting said pivot shafts of said trunnions on said support member; and a plurality of spherical-surface bearings for supporting said needle roller bearings;

wherein said spherical-surface bearings each includes spherical-surface-shaped inner and outer races, and wherein said axial-direction shifting movement of said trunnion is carried out between said pivot shaft and said needle roller bearing by a sliding movement of said trunnion.

* * * * *